(12) United States Patent
Corcoran

(10) Patent No.: US 9,511,830 B2
(45) Date of Patent: Dec. 6, 2016

(54) HIGH DENSITY STORAGE FACILITY

(75) Inventor: John F. Corcoran, Hyannis, MA (US)

(73) Assignees: Mary A. Corcoran, Hyannis, MA (US); Ellen T. Corcoran, Hyannis, MA (US)

( * ) Notice: Subject to any disclaimer, the term of this patent is extended or adjusted under 35 U.S.C. 154(b) by 1008 days.

(21) Appl. No.: 13/241,326

(22) Filed: Sep. 23, 2011

(65) Prior Publication Data

US 2012/0251277 A1 Oct. 4, 2012

Related U.S. Application Data

(63) Continuation-in-part of application No. 12/464,745, filed on May 12, 2009, now abandoned.

(60) Provisional application No. 61/514,057, filed on Aug. 2, 2011, provisional application No. 61/127,346, filed on May 12, 2008.

(51) Int. Cl.
| | | |
|---|---|---|
| *B65G 1/00* | (2006.01) | |
| *B63C 15/00* | (2006.01) | |
| *B65G 1/04* | (2006.01) | |
| *B65G 1/06* | (2006.01) | |
| *B65G 1/10* | (2006.01) | |

(52) U.S. Cl.
CPC ............. *B63C 15/00* (2013.01); *B65G 1/0478* (2013.01); *B65G 1/06* (2013.01); *B65G 1/10* (2013.01)

(58) Field of Classification Search
USPC .................... 414/266, 281, 284, 278, 331.01
See application file for complete search history.

(56) References Cited

U.S. PATENT DOCUMENTS

| | | | |
|---|---|---|---|
| 3,746,188 A | 7/1973 | Stienen et al. | |
| 4,307,922 A | 12/1981 | Rhodes | |
| 4,789,210 A | 12/1988 | Weiss et al. | |
| 5,062,242 A | 11/1991 | Corcoran | |
| 5,140,787 A | 8/1992 | Corcoran | |
| 5,860,783 A * | 1/1999 | Corcoran | ................... 414/142.6 |
| 6,077,019 A | 6/2000 | Corcoran | |
| 2004/0165974 A1 | 8/2004 | Gironi et al. | |

FOREIGN PATENT DOCUMENTS

| | | |
|---|---|---|
| GB | 327836 A | 4/1930 |
| GB | 576627 A | 4/1946 |
| GB | 1327943 A | 8/1973 |
| RU | 1792892 A1 | 2/1993 |

(Continued)

*Primary Examiner* — Saul Rodriguez
*Assistant Examiner* — Willie Berry, Jr.
(74) *Attorney, Agent, or Firm* — Hansen IP Law PLLC

(57) ABSTRACT

A high density storage facility including a plurality of rows of independently movable carriage racks, each row having a plurality of the independently movable carriage racks. Each carriage rack has a height, a length and a width, and defines a plurality of tiers, each tier defining at least one storage slot, the slots extending substantially the length of the carriage racks and being substantially open and accessible for inserting and removing objects into and from the width ends of the carriage racks. The carriage racks are disposed within the floor area and are independently movable along the floor in a direction consistent with the width of the floor area. Preferably, the carriage racks are arranged in the rows within the floor area with the lengthwise sides of the carriage racks being arranged substantially parallel to the lengthwise sides of the floor area.

13 Claims, 21 Drawing Sheets

(56) References Cited

FOREIGN PATENT DOCUMENTS

| RU | 51602 U1 | 2/2006 |
|----|----------|--------|
| WO | PCT/US 2009/02950 | 7/2009 |
| WO | PCT/US 2012/055669 | 3/2013 |

\* cited by examiner

HIGH DENSITY STORAGE FACILITY

RELATED APPLICATIONS

This application claims priority to U.S. application Ser. No. 12/464,745, filed on May 12, 2009, and U.S. Provisional Application Nos. 61/514,057, filed on Aug. 2, 2011 and 61/127,346, filed on May 12, 2008, all of which are incorporated herein by reference.

BACKGROUND

The present application relates to high density storage facilities, and more particularly to high density storage facilities for storing intermodal containers, boats and other large items.

Despite advances in building materials, material handling vehicles, and techniques, there is still a need for storage facilities for large sized objects such as intermodal containers, boats, cars, furniture and the like. Such facilities should provide mechanisms for obtaining ready and efficient access to the stored objects, as well as optimal use of storage space.

For example, conventional boat storage facilities include a large building with racks aligned along the walls and a large unoccupied floor space. This results in a large amount of unused space, as depicted in FIG. 1 for building B with corners C1, C2, C3 and C4. Two access entryways A1 and A2 are defined at an end of building B to enable a fork-lift truck to place and withdraw large items such as boats from the three stationary, fixed storage racks R1, R2 and R3.

A more efficient system is depicted in FIG. 2 based on U.S. Pat. No. 5,140,787 by the present inventor for facility F having building corners C1-C4 and a stationary rack S1 extending along length L of facility F. Multiple access doors A1, A2, A3 and A4 are provided along the length L. One or more of four movable elongated rectangular racks R1, R2, R3 and R4 can be rolled along length L to expose a selected rack row to a fork-lift truck entering through one of access doors A1-A4. However, many square feet of space must still be left open to provide turning and maneuvering room for the fork-lift truck, and multiple access doors must be provided along the side of an elongated building.

Container terminals for storing and retrieving intermodal containers exhibit similar problems. Conventional facilities consume large areas of valuable seaport acreage. Because conventional facilities may use numerous aisles and provide wide spaces between intermodal containers, and because such containers are generally randomly placed and widely spaced, many terminal operators have difficulty in controlling the storage, retrieval and delivery of the containers. This often results in time consuming and costly repositioning and searching operations for displaced containers.

Therefore, a need exists for a high density storage facility which provides ready and efficient access to the space within the facility where items may be stored.

SUMMARY OF THE INVENTION

An object of the present invention is to provide a highly modular and adaptable storage system which increases the storage capacity of a given area.

This invention features a high density storage facility including a plurality of rows of independently movable carriage racks, each row having a plurality of the independently movable carriage racks. Each carriage rack has a height, a length and a width, and defines a plurality of tiers, each tier defining at least one storage slot, the slots extending substantially the length of the carriage racks and being substantially open and accessible for inserting and removing objects into and from the width ends of the carriage racks. The carriage racks are disposed within the floor area and are independently movable along the floor in a direction consistent with the width of the floor area. Preferably, the carriage racks are arranged in the rows within the floor area with the lengthwise sides of the carriage racks being arranged substantially parallel to the lengthwise sides of the floor area.

In some embodiments, the carriages include a mechanism for moving the racks, such as at least one independently controllable motor to drivably move each carriage rack across at least a portion of the width of the floor area. The carriage racks may further be coupled and uncoupled along the width of the enclosed storage area for providing access to the width ends of the racks from the doors. The carriage racks may be connected and disconnected along their lengthwise sides, forming rows which are movable in a widthwise direction along the storage area. Tracks for rolling the carriage racks may extend along the width of the storage area. According to one embodiment, the carriages include motor mechanisms for moving the racks across a portion of the storage area. For some applications, it may be useful to include as many rows of carriage racks as will fit along the width of the storage area.

The number of carriage racks may be chosen such as to leave a portion of the floor area unoccupied, of a size sufficient to provide access from optional doors to the width ends of the carriage racks upon selective movement of carriage racks within the rows along the width of the storage area. According to one embodiment, the doors are selectively disposed along the wall of the building so as to provide access to the unoccupied floor area upon selective movement of one or more of the carriage racks in the rows of carriage racks along the width of the storage area. The unoccupied floor area may be selected to be of such size as to accommodate manipulation of the objects within the unoccupied floor area for insertion into the slots. The unoccupied floor area may further be selected to be of such a size as to be accessible to the doors upon movement of one or more of the carriage racks in the rows of carriage racks along the width of the floor area. A row of racks may include a series of spaced vertical supports interconnected by a series of spaced horizontal supports. The horizontal supports may be adjustable in position along the height of the vertical supports.

The facility may include a row of stationary racks arranged along at least one wall, the stationary racks having a certain length, width and height and being divided from top to bottom into storage slots. The slots may extend the length of the racks, and may be open and accessible from a width end for inserting and removing objects. The width ends of the racks may face the storage area.

BRIEF DESCRIPTION OF THE DRAWINGS

In the accompanying drawings:

FIGS. 17A-1 and 17A-2 are top left and right views, respectively, sharing match line ML-ML, of another high density storage facility according to the present invention;

FIGS. 18A-1 and 18A-2 are side elevational left and right views, respectively, sharing match line ML-ML, of the stationary racks of FIGS. 17A-1 and 17A-2 aligned with the length of the storage facility;

FIGS. 20A-1, 20-A-2, 20B, 20C and 20D are schematic side elevational views of different carriage configurations A, B, C and D of FIGS. 17A-1 and 17A-2;

DETAILED DESCRIPTION

This invention may be accomplished by a high density storage facility including a plurality of rows of independently movable carriage racks, each row having a plurality of the independently movable carriage racks. Each carriage rack has a height, a length and a width, and defines a plurality of tiers, each tier defining at least one storage slot, the slots extending substantially the length of the carriage racks and being substantially open and accessible for inserting and removing objects into and from the width ends of the carriage racks. The carriage racks are disposed within the floor area and are independently, selectively movable as desired along the floor in a direction consistent with the width of the floor area to provide access to a chosen storage slot within a determined row. Preferably, the carriage racks are arranged in the rows within the floor area with the lengthwise sides of the carriage racks being arranged substantially parallel to the lengthwise sides of the floor area. The following description sets forth illustrative embodiments of the present invention, it being understood that other embodiments not specifically described herein are encompassed by the present invention.

Figure 3:
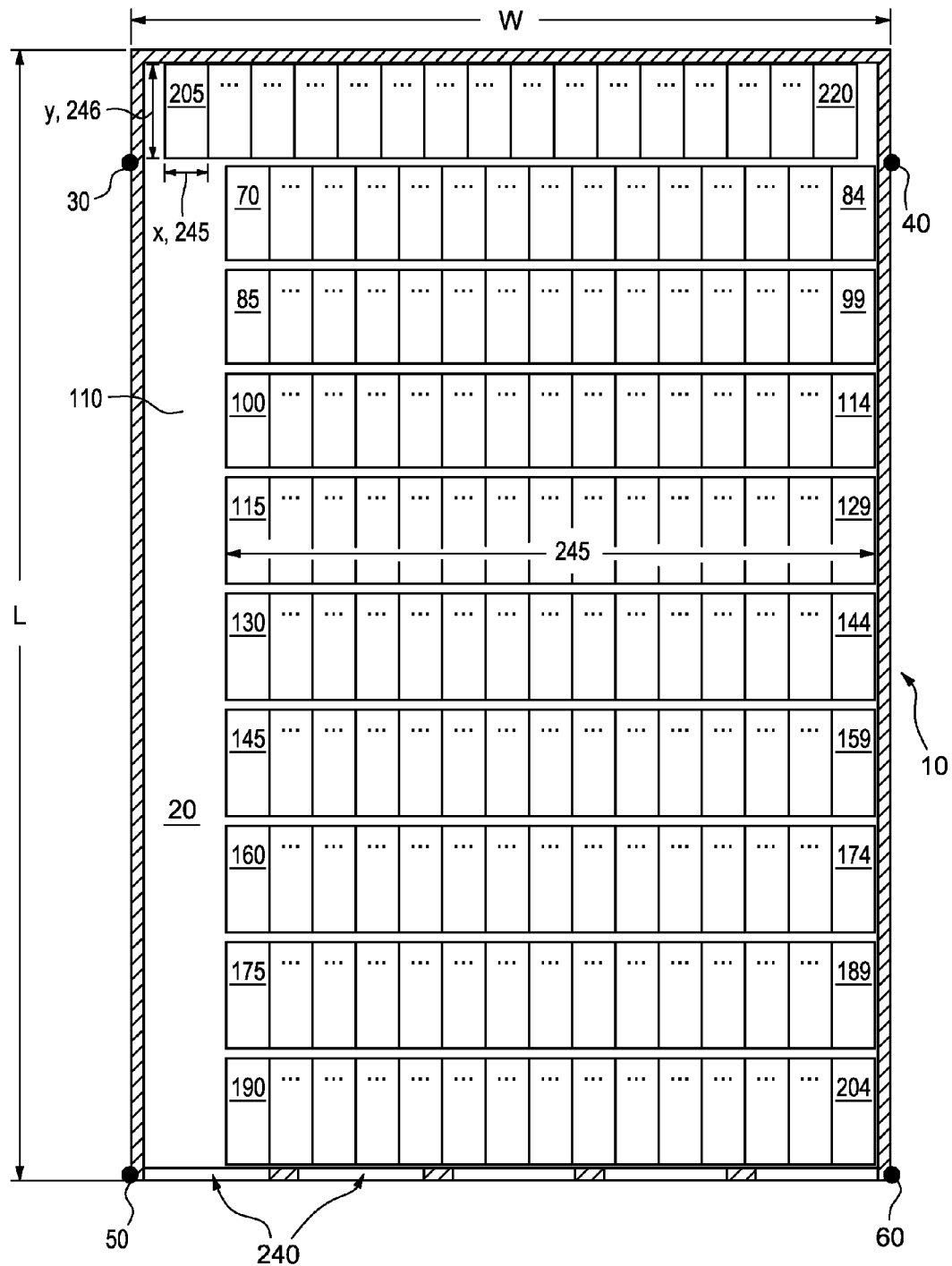
FIGS. 3-8 depict an exemplary embodiment of a floor plan and operation of a storage facility utilizing carriage racks according to the present invention.

FIGS. 3-8 show the overall floor plan of an illustrative storage facility 10. In one embodiment, a floor area 110 which is defined by lines connecting points 30, 40, 50, 60 is provided. The floor area may be in the shape of a polygon, for example, a rectangle or a square. The floor area includes a width, designated "W" in FIG. 3, and a length, designated "L" in FIG. 3. The direction indicated by the double-arrows associated with the width W in FIG. 3 is referred to herein as the "widthwise direction," and the direction indicated by the double arrows associated with the length L in FIG. 3 is referred to herein as the "lengthwise direction.

Figure 4:
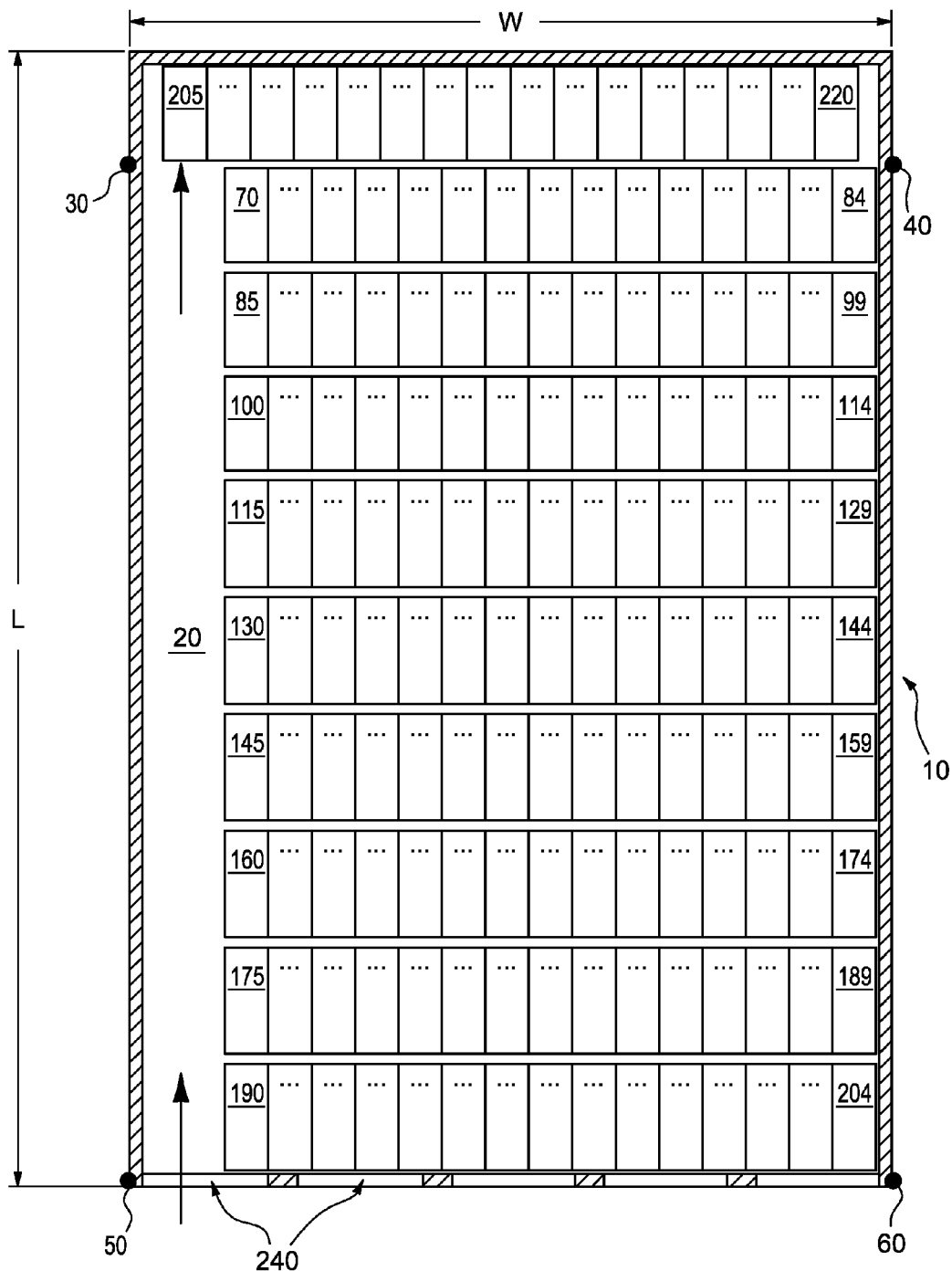

As depicted in FIGS. 3 and 4, an exemplary embodiment has a floor area of 275 feet by 425 feet, which allows a number of suitably placed carriage racks to be accessed. One having ordinary skill in the art will understand that the floor area may be greater or smaller than that shown, depending on the application. More or fewer carriage racks may be employed as needed. The carriage racks and the fixed racks each have a length and a width, as indicated by length "Y" 246 and width "X" 245 of fixed rack 205 in at least FIG. 3. While the length and width have been described with relation to fixed rack 205, each carriage rack as discussed below has a length "Y" 246 and width "X" 245. Each fixed rack has a length and a width along the same axes defined in relation to fixed rack 205. Likewise, each carriage rack has a length and a width along the same axes defined in relation to other carriage racks in the same row and adjacent rows. The lengthwise direction of the fixed racks and the carriage racks may correspond to the lengthwise direction of the floor area, and the widthwise direction of the rack may correspond to the widthwise direction of the floor area.

A carriage rack is a movable rack, which may include means for locomotion integrated into the frame of the carriage, or may be mounted on a movable carriage structure. A plurality of movable carriage racks 70-84, 85-99, 100-114, 115-129, 130-144, 145-159, 160-174, 175-189, and 190-204 are arranged as shown in rows within floor area 110, each row including a number of individual racks. Depending on the application, as many or as few carriage racks as needed may be selected. In the illustrative embodiment depicted in FIG. 4, each row includes 15 carriage racks. In this illustrative embodiment, a selected width of the area 110 is filled with carriage racks, for purposes of maximum space utilization. In other embodiments, concerns other than space utilization may call for a different configuration or a different number of racks.

Figure 9:
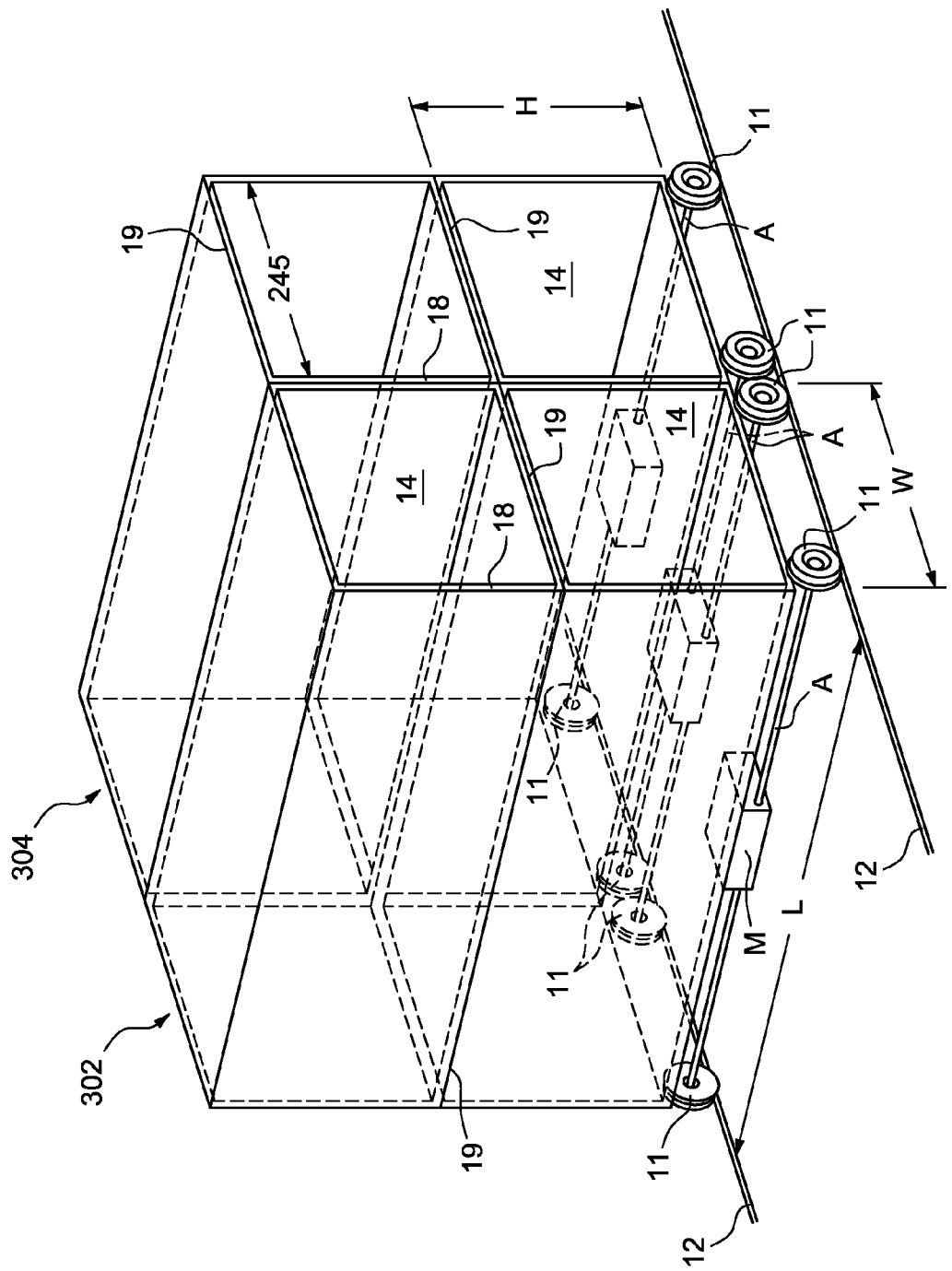
FIG. 9 is a schematic view of a pair of carriage racks coupled together and mounted on wheels set in parallel tracks for rolling the carriage racks along the floor.

In the illustrative embodiment, each row of carriage racks 70-84, 84-99, 100-114, 115-129, 130-144, 145-159, 160-174, 175-189, and 190-204 is movable widthwise along the area 110. The rows may be mounted on rotatable rollers or wheels, such as wheels 11, FIG. 9, which are in turn mounted in guides, slots or rails such as tracks 12 which extend a selected width of area 110, FIG. 3. Alternatively, the rows may be mounted using any other system that facilitates the movement of the carriage racks, such as a magnetic levitation system, an air levitation system that allows movement of the rows of racks, or a system of wheels without a track, the system of wheels can include one or more tires. In the illustrative embodiment, wheels 11, FIG. 9, are mounted at the bottom of both widthwise sides of each carriage rack 302, 304 and a series of spaced parallel tracks 12 are provided along the width of the area 110 to coincide with the direction of displacement. It is not a limitation of the invention that consecutive even reference numbers 302 and 304 are utilized in FIG. 9, while consecutive odd and even numbers are utilized in FIGS. 3-8. In some embodiments, each carriage rack in each row is movable independent of other carriage racks in the row. For example, in some embodiments carriage rack 70 moves independently of carriage racks 71-84. In some embodiments two or more racks are coupled or formed together to move in unison. For example, in some embodiments carriage racks 70 and 71 move in unison.

In the embodiments shown in FIGS. 3-8, all of the carriage racks in each row have the same length and width, although the lengths and widths of individual rows of carriage racks may vary. In that case, the widthwise disposition of wheels and complementary tracks 12 should coincide with the lengths of each individual carriage rack. The tracks may extend the width of area 110, i.e. between the line connecting points (30, 60) and points (40, 50). Alternatively, the tracks may extend a different distance, depending on the particular application. In some embodiments the widths 245, FIG. 10B, of individual carriage racks may vary from row to row or in a row. In some embodiments the lengths 246 of carriage racks may vary from row to row or in a row.

Each carriage rack may be divided into slots 14, FIG. 9, from top to bottom. In applications such as boat storage, one having ordinary skill in the art will appreciate that the total height of the slots may be determined by the facility. However, the size of the carriage racks may vary depending on the application.

In one embodiment, the carriages and racks are a unitary structure including a series of parallel vertically oriented supports 18 connected from top to bottom by a series of parallel horizontal 19 supports. Conventional mechanisms may be provided for adjusting a horizontal support up and down along the vertical supports 18. For example, the mechanisms may adjust the horizontal support in increments of, for example, inches, or may adjust the horizontal support in larger or smaller increments, depending on the application. In one embodiment, the vertical distance between successive horizontal supports defines the slot height and the horizontal distance between successive vertical supports 18 defines slot width.

According to one embodiment, a series of doors 240, FIGS. 3-8, are disposed along one widthwise wall of the facility. An unoccupied and changeable service and loading area 20 may be provided, the size of which may be selected based on a number of factors. Such factors may include where doors 240 are disposed along the outer wall.

When carriage racks in a row 70-84, 85-99,100-114,115-129,130-144,145-159,160-174,175-189, and 190-204 are appropriately moved along the floor area 110, enough floor area 20 may be left unoccupied so as to enable the user to gain access to the width ends 245 of each row. As shown in FIGS. 3-8, the unoccupied floor area 20 may be large enough relative to the displacement of doors 240 so as to enable a user of the facility to gain access to the width ends 245 of the carriage racks. This can be accomplished by moving one or more carriage racks sufficiently to enable a user to gain access to the width ends 245 of racks in a row through a door 240. Objects to be stored in the slots may be inserted via the width ends 245 of the carriage racks. In some embodiments, objects to be stored in the slots may be inserted via the length wise opening 246 of the carriage racks.

As shown in FIGS. 3-8, a stationary row of racks 205-220 along the doorless widthwise wall may be provided. This may allow for greater storage utilization in the facility. The width ends 245 of racks 205-220 may also be accessible through at least one door 240 by appropriate movement of carriage racks in rows 70-84, 85-99,100-114,115-129,130-144,145-159,160-174,175-189, and 190-204 of carriage racks along the width of area 10.

The size of the unoccupied floor area 20 may be selected such that it is large enough to allow the objects to be stored in the carriage racks and to be manipulated into the width ends 245 of the carriage racks. For example, the length and width of the unoccupied floor space 20 may be selected to be long enough and wide enough to enable a forklift to align itself parallel to the length of the carriage racks for insertion and removal of the boat(s) into and from the width ends 245 of the carriage racks. Likewise, the size of the unoccupied floor area 20 may be selected such that it is large enough to allow the objects to be stored in the carriage racks and to be manipulated into the length wise opening 246 of the carriage racks. For example, the length and width of the unoccupied floor space 20 may be selected to be long enough and wide enough to enable a forklift to align itself perpendicular to the length of the carriage racks for insertion and removal of an intermodal container from the length wise opening 246 of the carriage racks.

Figure 5:
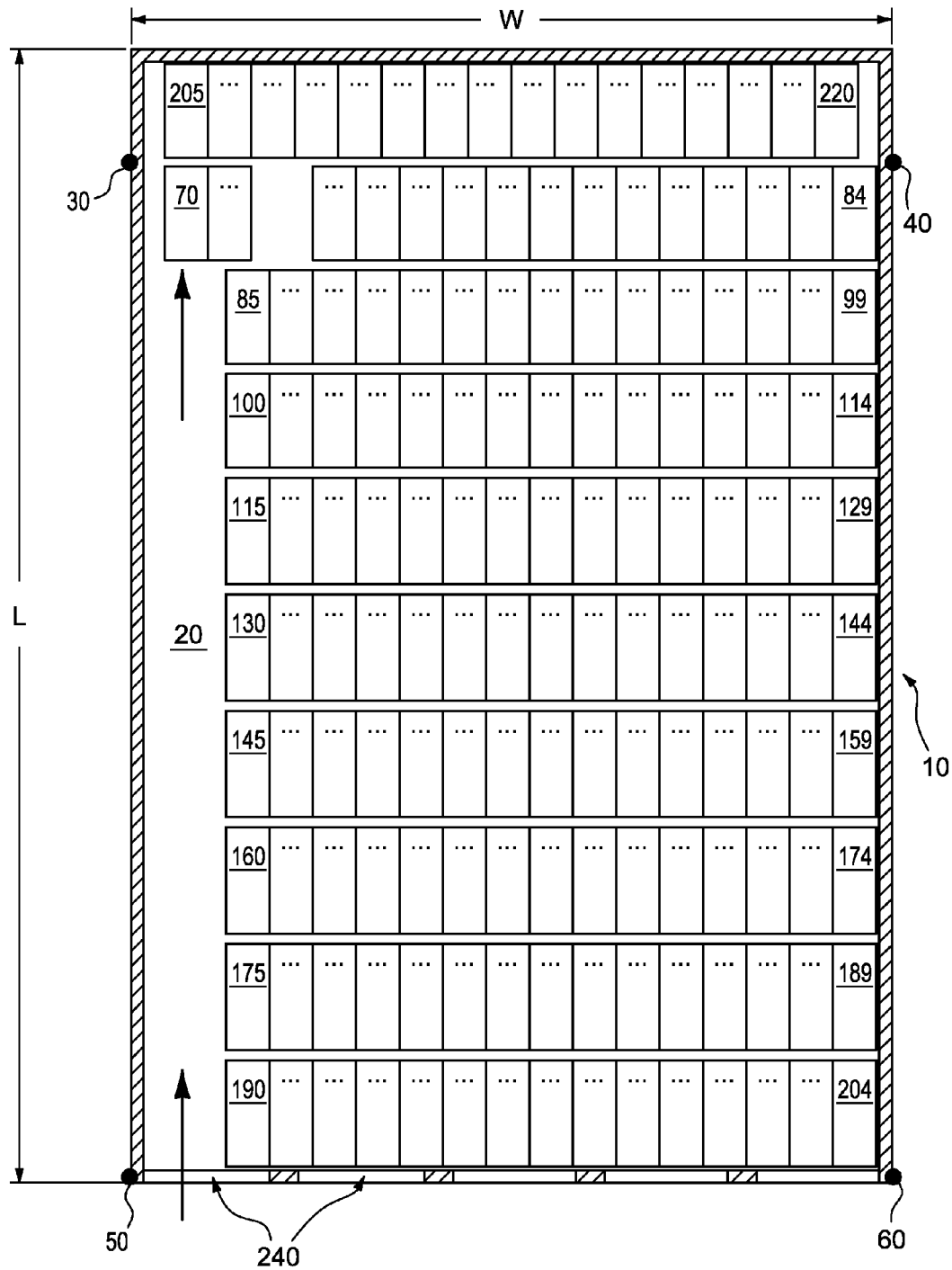
Figure 6:
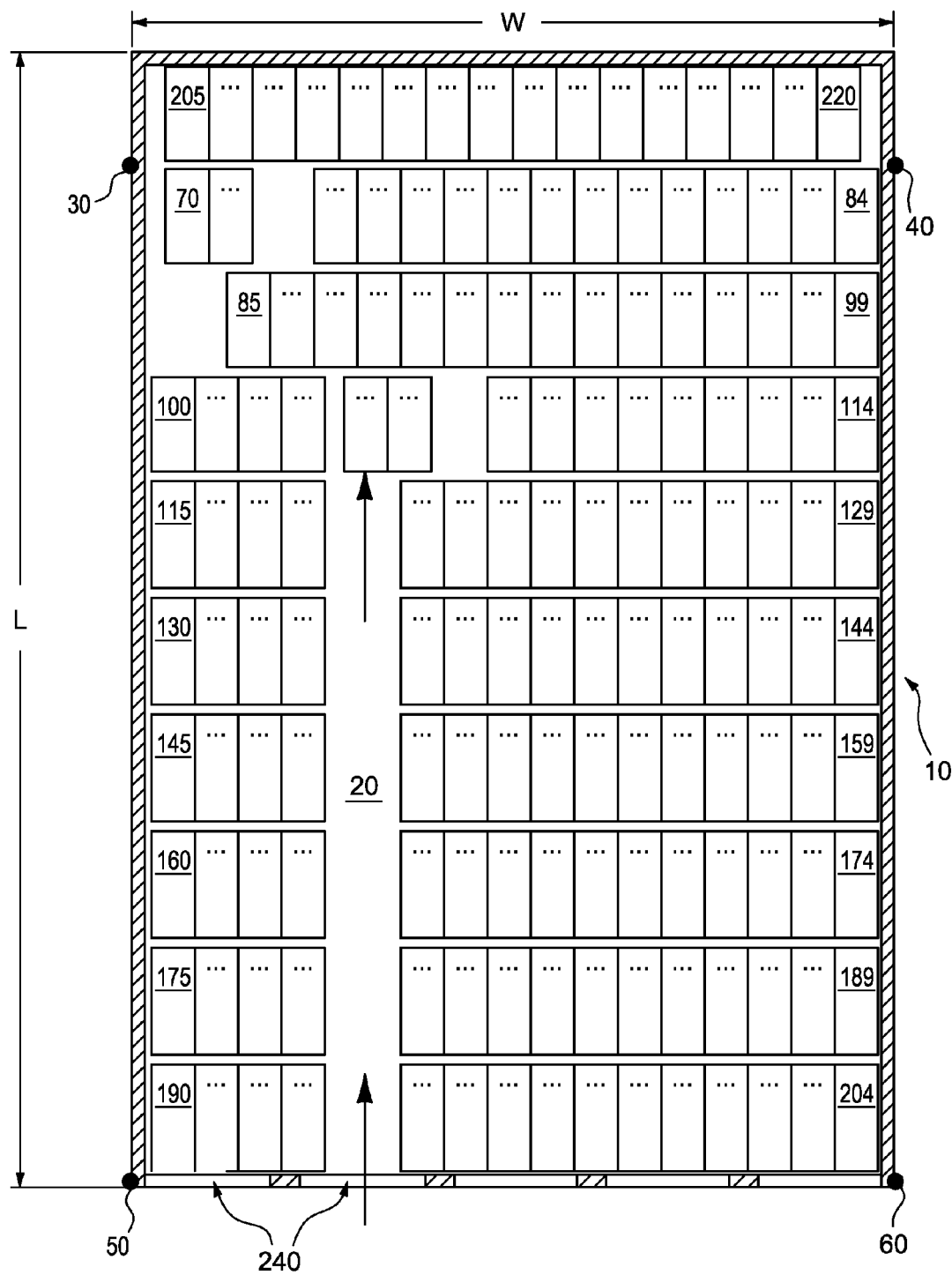
Figure 7:
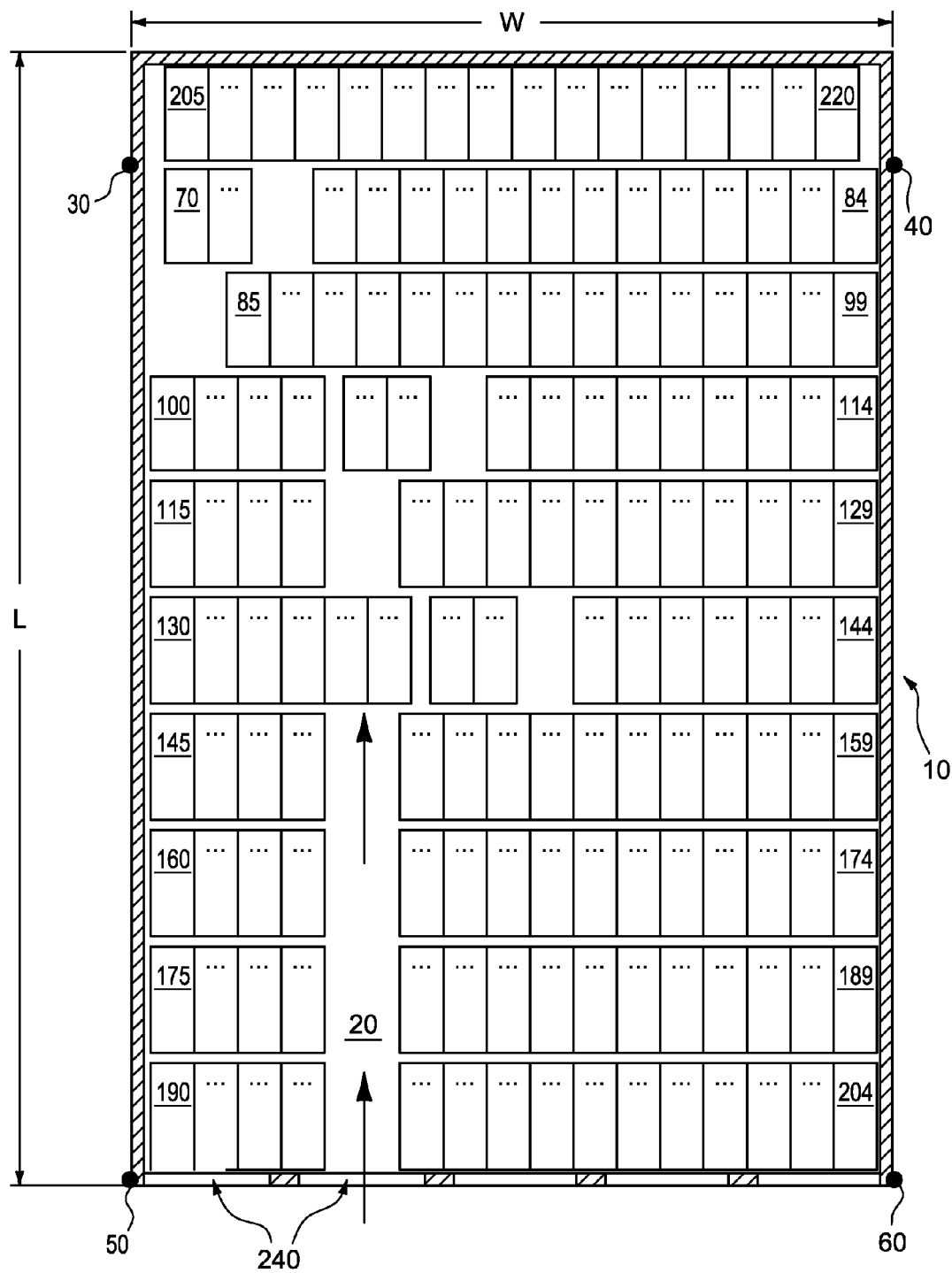
Figure 8:
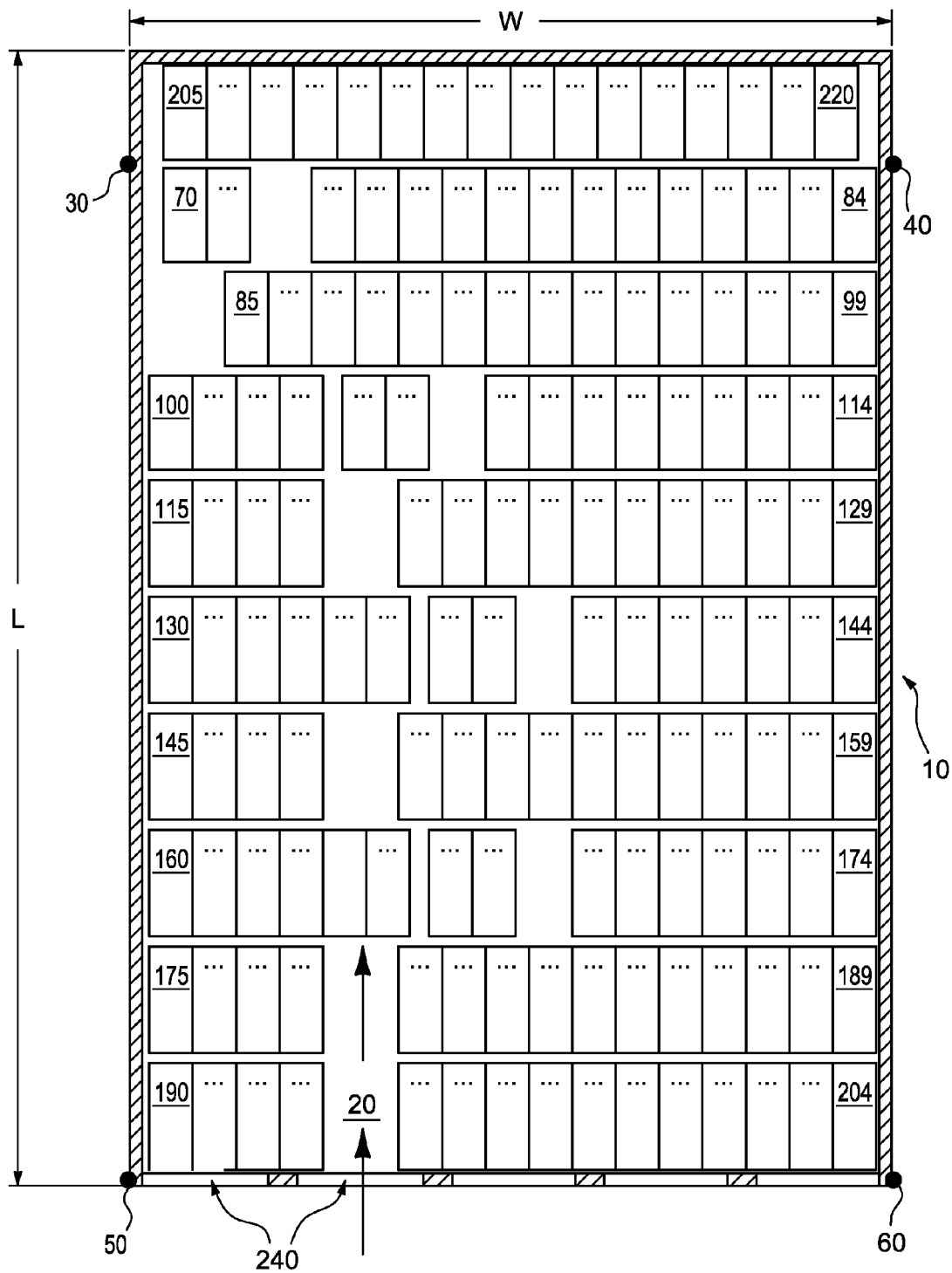

FIG. 4 depicts unoccupied floor space 20 at the far left of the floor area 110. This configuration may facilitate, for example, access to the width end 245 of rack 220. However, with reference to FIGS. 5-6, a user may desire to gain access to the width end 245 of carriage rack 104 to remove an object from the rack. According to one embodiment of the present invention, appropriate carriage racks may be shifted in a widthwise direction with respect to the floor area 110, as depicted in FIGS. 5-6. In FIG. 6, the appropriate carriage racks have been shifted such that unoccupied floor space 20 provides a passage to the width end 245 of carriage rack 104, allowing access to carriage rack 104, for example, by a forklift. In FIG. 7, the carriage racks have been further shifted to provide a passage via unoccupied floor space 20 to the width end 245 of carriage rack 136. Similarly, in FIG. 8, appropriate carriage racks have been shifted in order to provide access via unoccupied floor space 20 from the door to the width end of carriage rack 167.

In one embodiment, the lengths and widths of movable carriage racks 70-84, 85-99,100-114,115-129,130-144,145-159,160-174,175-189 and 190-204 may vary among different movable rows provided within a facility 110. The facility 110 may be provided with an unoccupied area 20 of at least a size sufficient to obtain access through an appropriate door 240 to all of the width ends 245 of the carriage racks. This may be accomplished, for example, upon appropriate widthwise movement of successive rows of carriage racks within a floor area defined by lines between points 30, 40, 50, and 60. The facility 10 may be provided with a stationary row of racks 205-220. These stationary racks may also have varying widths, or may be of the same width, and may be located along a doorless wall. The movable carriage racks 70-84, 85-99,100-114,115-129,130-144,145-159,160-174,175-189, and 190-204 may be aligned such that their lengthwise dimensions are substantially parallel to the lengthwise dimension of area 110.

In some embodiments, it may be necessary or desirable to access the length ends of the carriage racks. For example, intermodal containers may be stored in the racks which must be lifted, for example by a forklift, from the length ends. Accordingly, the racks may be oriented so as to afford access to the length ends from the doors.

In more detail, FIG. 9 depicts a schematic front view of a pair of illustrative coupled carriage racks 302 and 304 according to the present invention. The racks are divided into slots 14 by vertical supports 18 and by horizontal supports 19. A row of carriage racks may extend across the width of a selected defined floor space (e.g. between points 30, 60 and 40, 50), or may extend across any width that is appropriate to the particular application. The movable coupled racks may be mounted on rollable, rotatable wheels 11 which, in turn, may be mounted within complementary tracks 12 provided on the floor surface. In one embodiment, each axle A has at least one drive motor M to provide redundant systems to move the carriage racks.

Figure 10A:
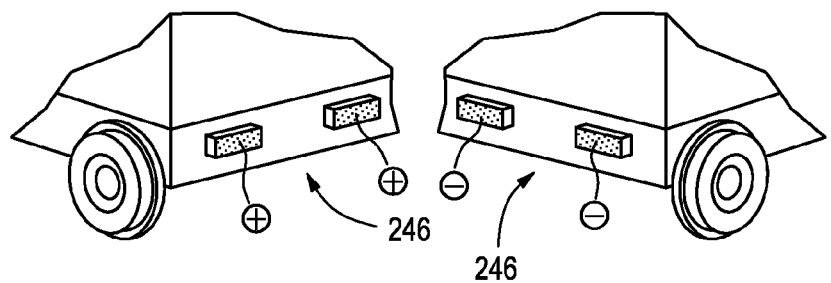
FIG. 10A depicts an electromagnetic coupling system suitable for use with illustrative embodiments of the present invention.
Figure 10B:
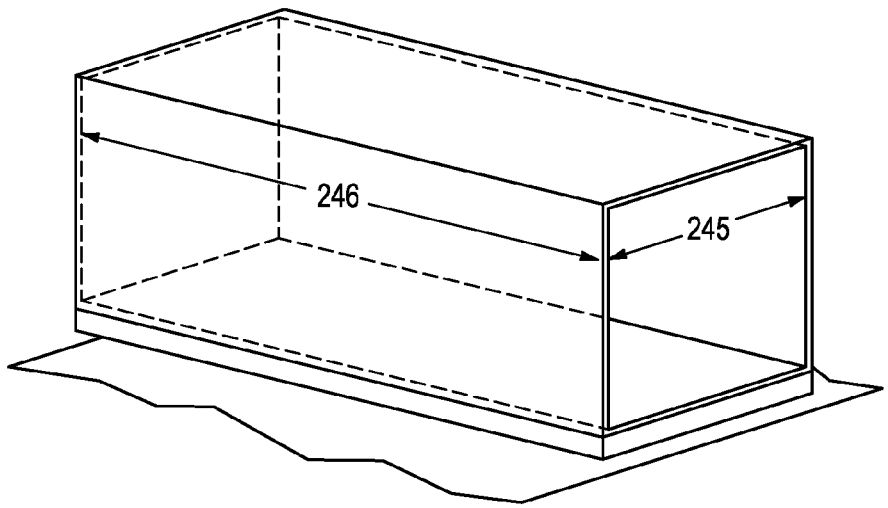
FIG. 10B depicts an exemplary rack, mounted on an electromagnetic carriage suitable for use with a maglev system according to exemplary embodiments.
Figure 10C:
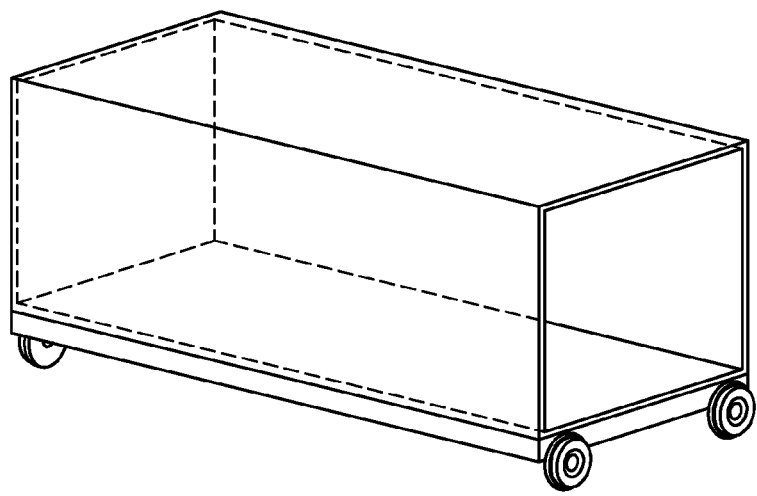
FIG. 10C depicts an exemplary rack, mounted on a wheeled carriage suitable for use with a maglev system according to exemplary embodiments.

The racks may alternatively be mounted on carriages. For example, FIG. 10B depicts an exemplary rack, mounted on an electromagnetic carriage suitable for use with a maglev system according to exemplary embodiments of the present invention. FIG. 10C depicts an exemplary rack, mounted on a wheeled carriage suitable for use with a maglev system according to exemplary embodiments of the present invention.

The carriage racks may be coupled along the lengthwise side, the widthwise side, or both. The carriage racks may be coupled using any suitable coupling method, such as by an electromagnetic coupling system, an electromotive coupling system, or a mechanical coupling system such as a system of hooks. For example, FIG. 10A depicts an electromagnetic coupling system suitable for use with illustrative embodiments of the present invention, such as to join together the lengths 246 of two carriages.

In one embodiment, the rows of fixed racks 205-220, FIGS. 3-8, may be aligned such that their width ends 245 face the widthwise side of area 110 and are substantially parallel thereto. The stationary racks may be smaller, lengthwise or widthwise or both, than the movable racks for purposes of ease of loading, unloading and storage of smaller objects. Alternatively, the stationary racks may be of the same size as the movable carriage racks, or larger, depending on the application.

In one embodiment, motor means may be provided to drive the movable carriage racks in the rows of carriage racks along the lengths of area 110. Remote control means for the motor means may be provided for access to the user outside of area 110. These remote control means may be outside, such as on the outside surfaces of the walls in which access doors 240 are disposed. The user can thus drivably move the carriage racks remotely from outside areas 20, 110. Alternatively, the remote control means may be located inside, as appropriate to the application. The motor means may also be controlled locally.

Figure 11:
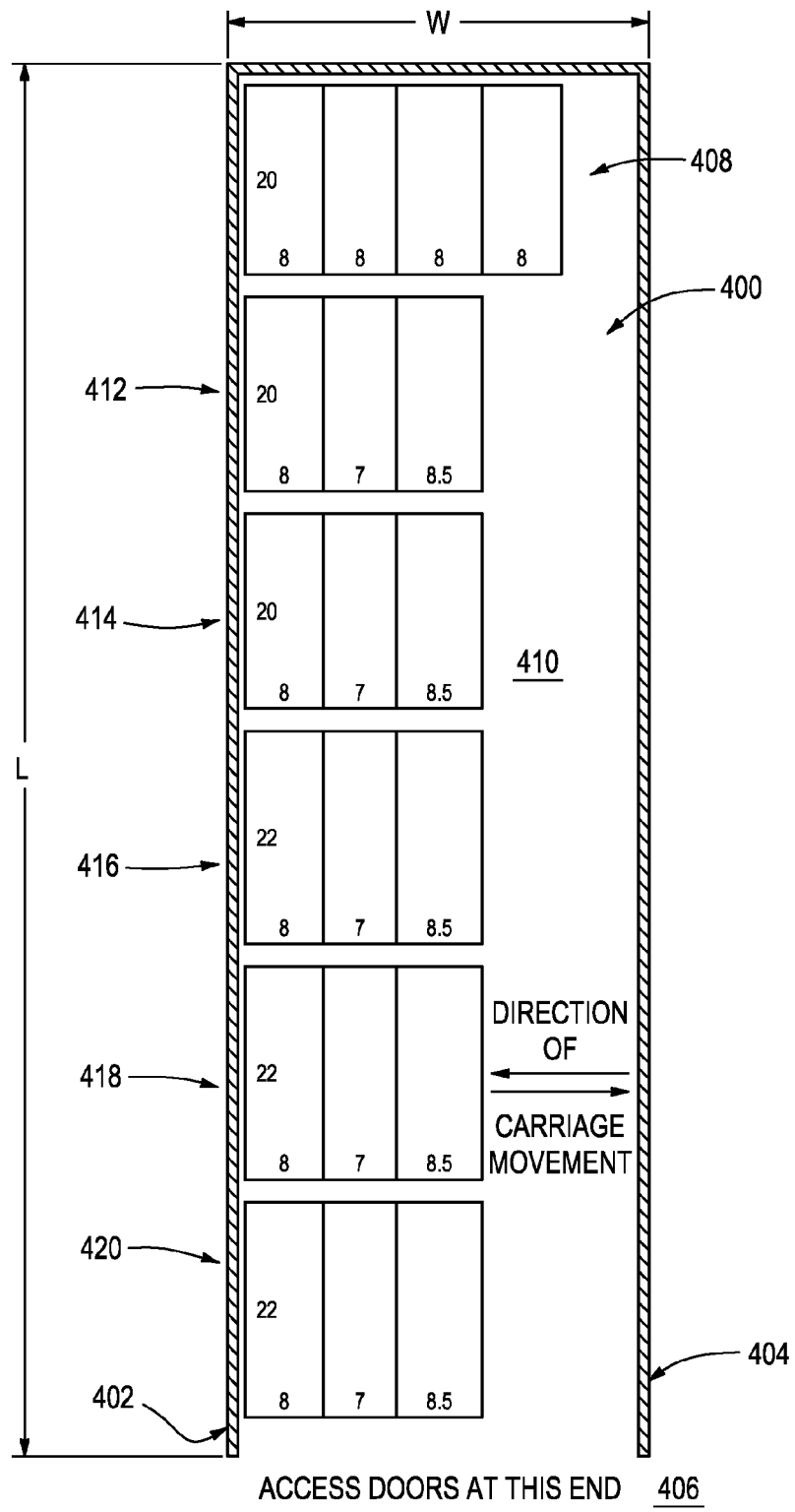
FIG. 11 is a top view of a narrow storage area converted into a high density storage facility according to the present invention.

FIG. 11 depicts a storage facility 400 according to the present invention nestled between walls 402 and 404 defining a narrow width W. For this example, width W is 35 feet and length L is 140 feet. Access for fork-lift trucks is provided at end 406, where one or more access doors can be constructed. Row 408 has four 20-feet long by 8-feet wide storage slots in a first tier, which is provided by four movable carriage racks in one construction and is a single stationary rack having four slots in another construction. Movable fork truck aisle 410, having a width of 11 feet for the carriage positions shown in FIG. 11, represents the open area needed within storage facility 400 to manipulate movable carriage racks in rows 412, 414, 416, 418 and 420 as needed to access a selected storage slot. Each row 412-420 is formed of three independently movable carriage racks which move substantially along width W between walls 402 and 404. In the illustrated construction, each row 412-420 has one carriage having a width of 8 feet, a second, middle carriage having a width of 7 feet, and a third carriage having a width of 8.5 feet. Carriage racks in rows 412 and 414 have lengths of 20 feet while carriage racks in rows 416-420 have lengths of 22 feet. The movable carriage racks provide a total of fifteen storage slots on the first tier to accommodate 15 items of different sizes and lengths on the first tier, such as different types of boats. Adding a second tier to each carriage rack and the stationary rack doubles the storage slots to 38 items. Five tiers would handle at least 95 items, assuming one storage slot per tier; other storage slot per tier configurations are described below.

Figure 2:
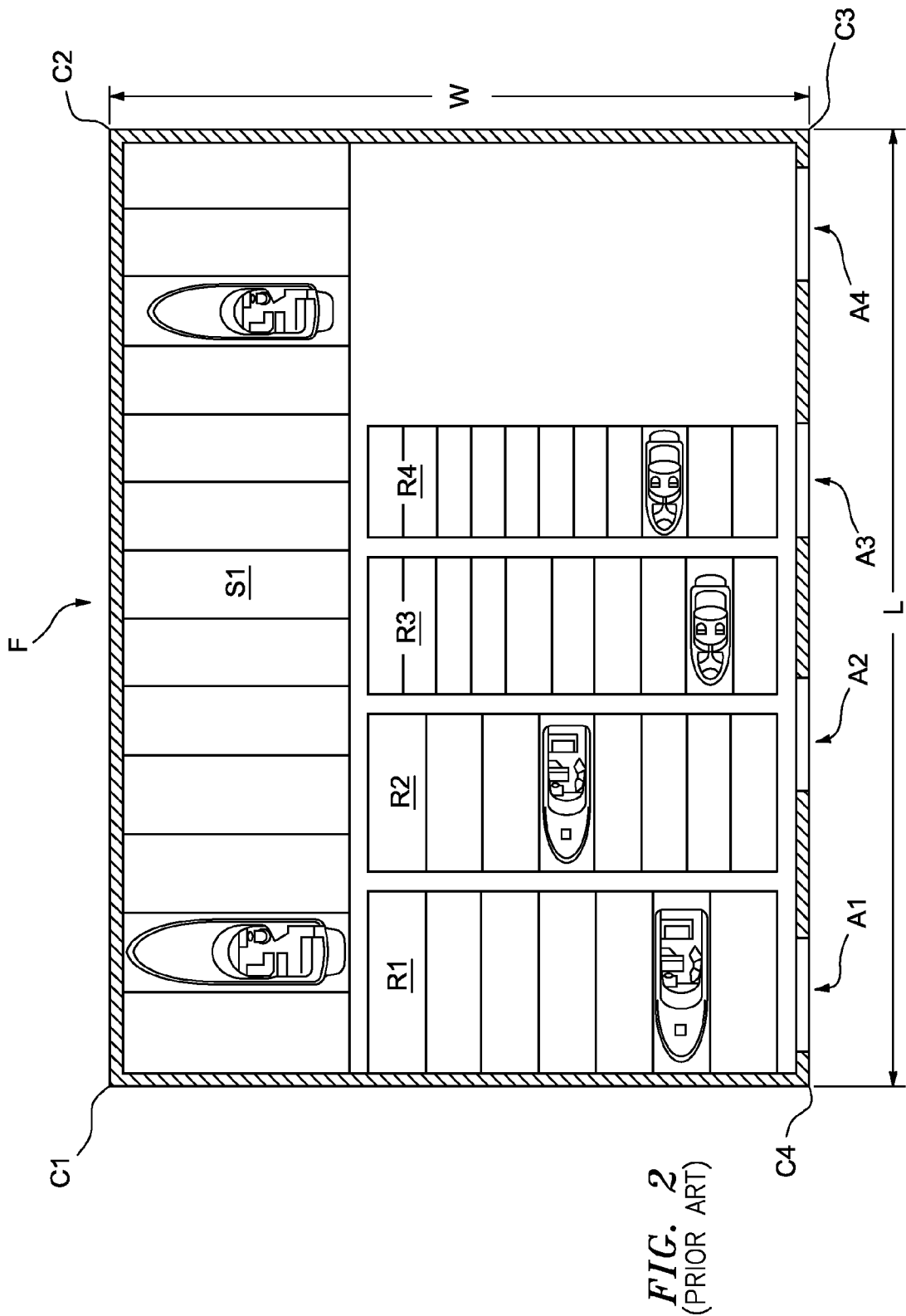
FIG. 2 depicts a known floor plan as taught in U.S. Pat. No. 5,140,787.
Figure 12:
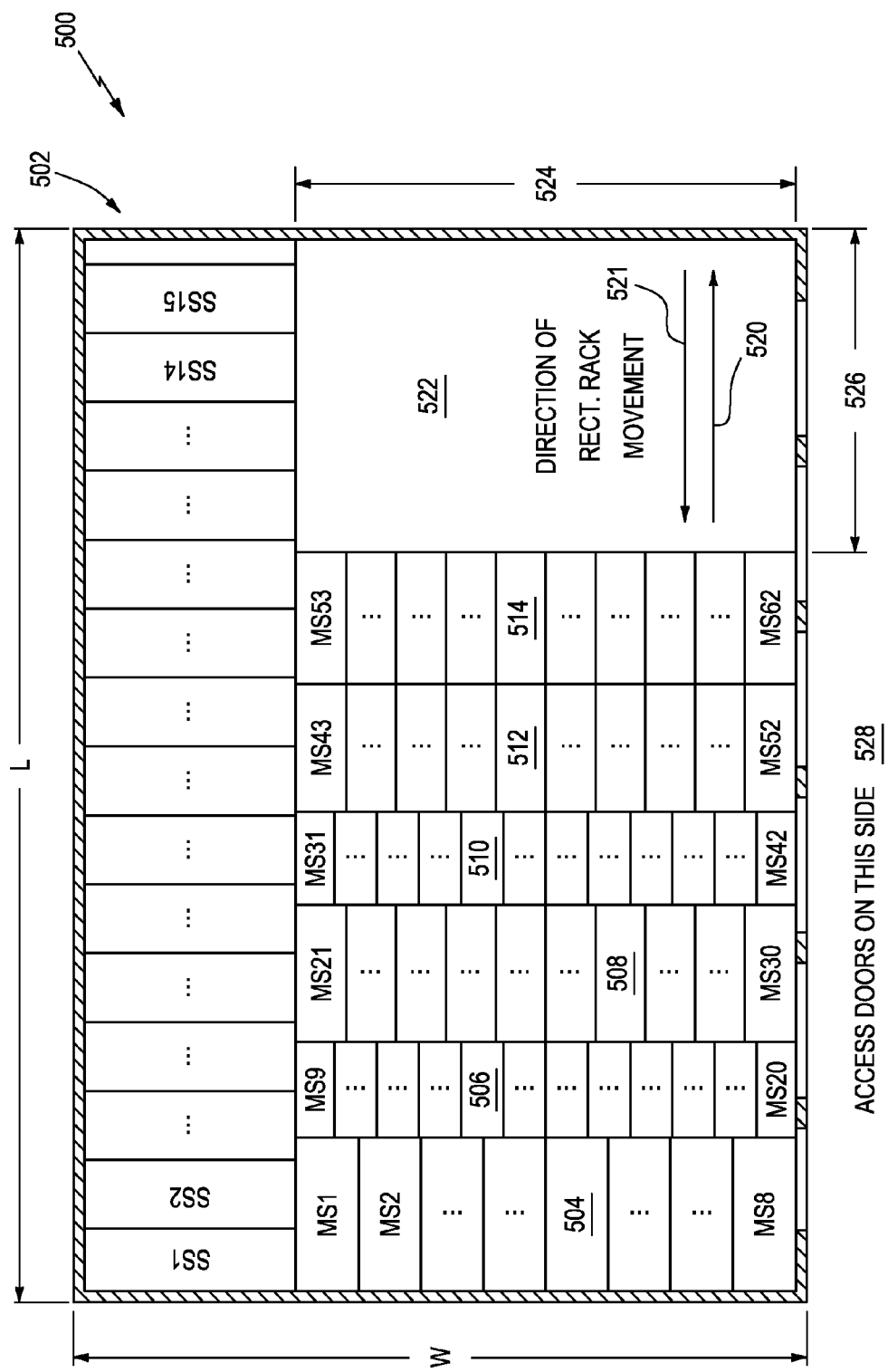
FIG. 12 is a top schematic view of a storage facility similar to FIG. 2 showing six rectangular racks and a wide fork-lift truck aisle area.

Storage facility 500, FIG. 12, is similar to facility F in FIG. 2 as described above in the Background and is also based on U.S. Pat. No. 5,140,787 by the present inventor. In this construction, facility 500 has an overall length L of 200 feet and an overall width W of 135 feet. A single stationary rack 502 extends along the length L defining fifteen stationary slots SS1-SS15 in a first tier. Facility 500 further includes six movable rectangular racks 504, 506, 508, 510, 512, and 514 each defining a number of movable slots MS1-MS8, MS9-MS20, MS21-MS30, MS31-MS42, MS43-MS52, and MS53-MS62, respectively, with the width ends of the slots facing the width ends of facility 500 and facing the direction of movement indicated by arrows 520 and 521. In other words, each rectangular rack row of boats is moved "fore and aft" or "bow and stern" relative to the position of the boats in the rack rows. Facility F can handle up to 77 boats, ranging in length from twenty feet to thirty nine feet, on tier level 1. Having four levels of tiers with similar storage slots would provide a maximum capacity of 308 boats or similar items for this configuration of facility 500.

Facility 500 requires an open fork truck aisle space 522 having dimensions of 95 feet, arrow 524, by 60 feet, arrow 526, for a total of 5,700 square feet of open space, to accommodate movement in the length-wise direction, arrows 520 and 521, of the six rectangular rack rows 504-514. Access doors must be provided along length side 528.

Figure 13:
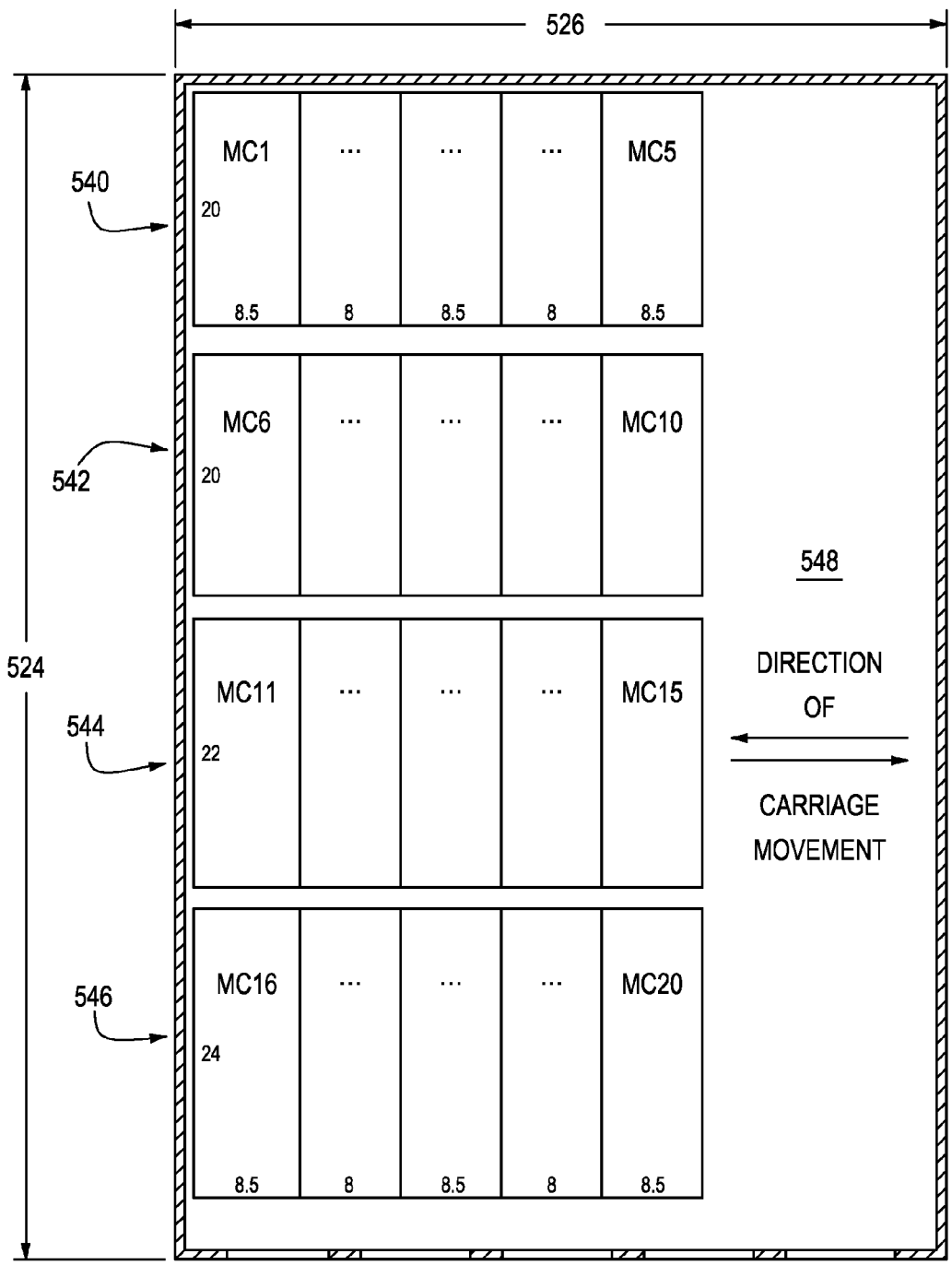
FIG. 13 is a top view showing how additional storage slots can be provided according to the present invention for the facility of FIG. 12 after a retrofit.

By comparison, if independently movable carriage racks according to the present invention are installed, and rotated ninety degrees so that their width ends face side 528, an additional 20 boats can be added per tier as shown in FIG. 13 for the area bounded by arrow 524 of 95 feet and by arrow 526 of 60 feet. Installing four levels of tiers would increase the capacity by an additional 80 boats while still providing access to stationary storage slots in rack 502, FIG. 12, as needed. Movable carriage rack rows 540, 542, 544, and 546 each have movable carriage racks MC1-MC5, MC6-MC10, MC11-MC15, and MC16-MC20, respectively. In this construction, carriage racks MC1-MC10 have lengths of 20 feet each, carriage racks MC11-MC15 have lengths of 22 feet each, and carriage racks MC16-MC20 have lengths of 24 feet each. The widths of the carriage racks within each row are 8.5 feet, 8 feet, 8.5 feet, 8 feet, and 8.5 feet, with fork truck aisle 548 having a width of only 18 feet. Boats on movable carriage racks according to the present invention would be selectively moved "beam-to-beam" or side-to-side throughout facility 500 after a retrofit as taught herein. Alternatively, if a facility has an independent, unoccupied space bounded by the dimensions shown in FIG. 13, two additional storage slots can be added to row 540, per tier.

Figure 14:
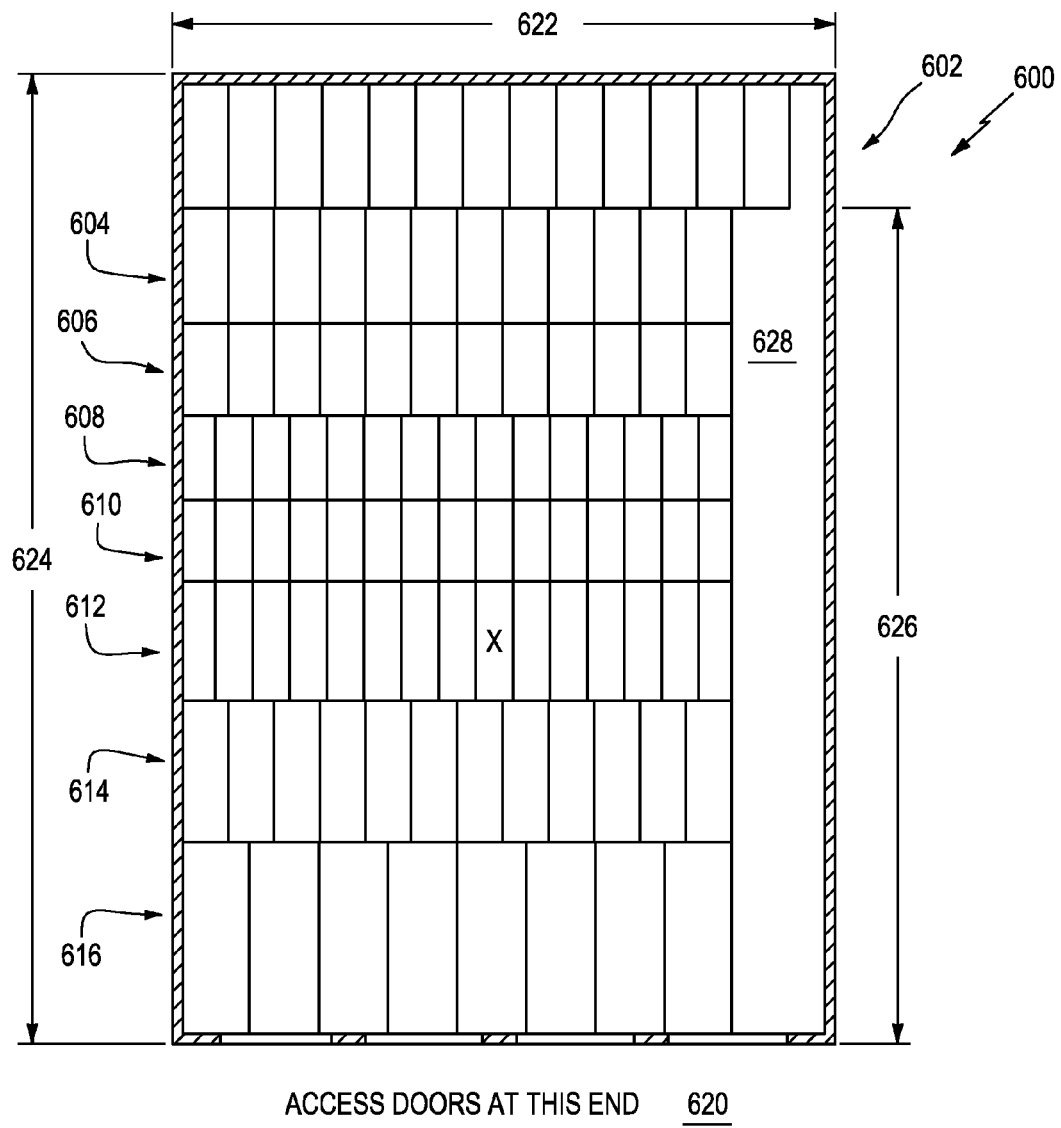
FIGS. 14 and 15 are schematic top views of another high-density storage facility according to the present invention.
Figure 15:
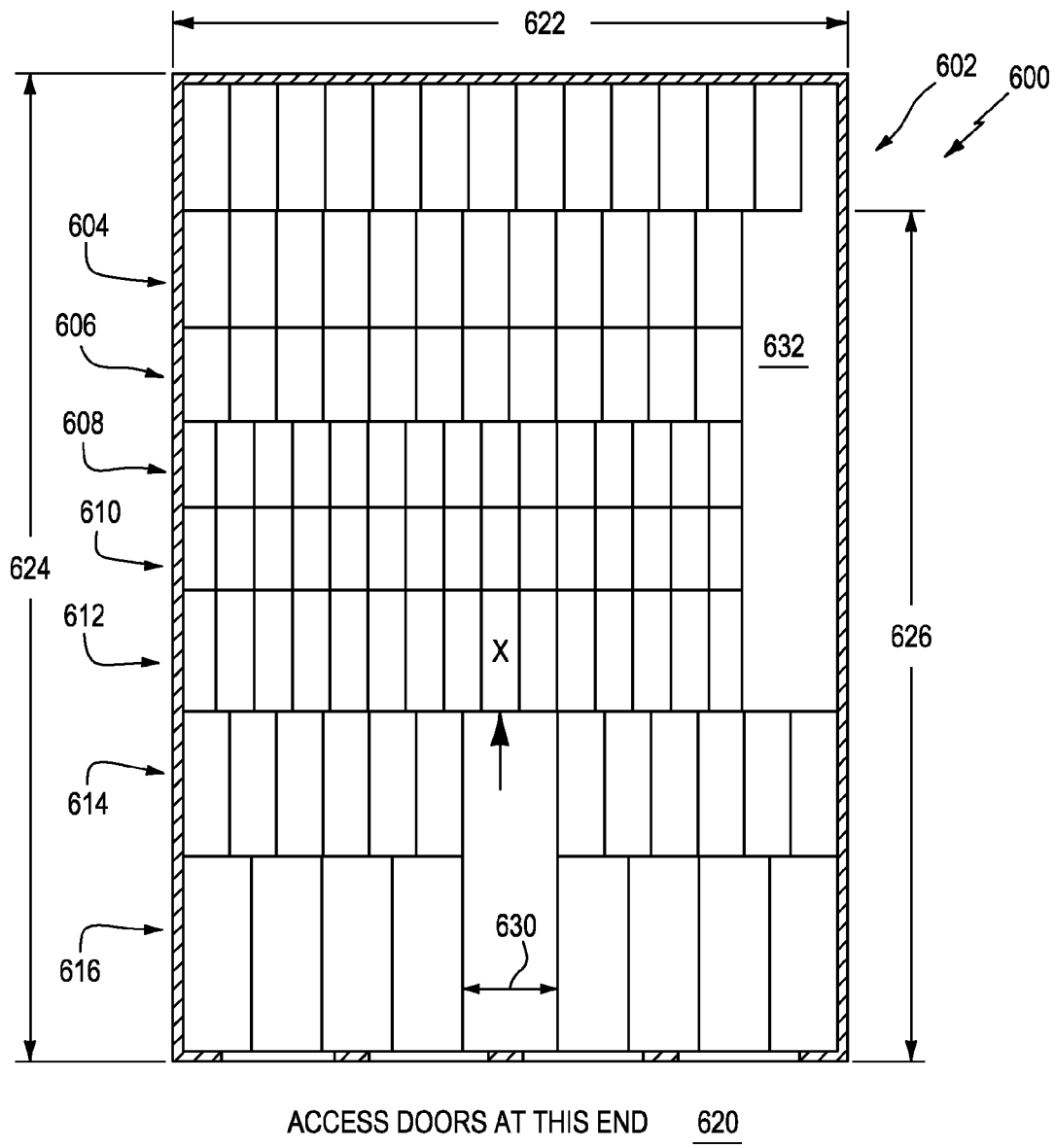

Storage facility 600 according to the present invention, FIGS. 14 and 15, has a stationary rack 602 and seven rows 604, 606, 608, 610, 612, 614 and 616 of movable carriage racks with their width ends facing narrow end 620. In one construction, facility 600 has an overall width of 135 feet, arrow 622, and an overall length of 200 feet, arrow 624, for a total of 27,000 square feet. Mobile carriage racks of rows 604-616 require an open fork truck aisle 18 feet wide for a length indicated by arrow 626 of 170 feet to 173 feet, for a total open space of approximately 3,060 to 3,114 square feet.

To retrieve an item at location X in a carriage rack in row 612, carriage racks in rows 614 and 616 are shifted to the right, into open space 628, as shown in FIG. 15. The open space 628, FIG. 14, is now divided into two areas 630 and 632, FIG. 15, each having a width of 18 feet.

The first tier level of facility 600 can typically handle 102 boats ranging in length from 20 feet to 39 feet, and four tier levels would accommodate up to 408 of such boats. Retrofitting a conventional storage facility having a width of 135 feet and a length of 200 feet with an open end 620 with mobile carriage racks according to the present invention can dramatically increase the overall storage capacity. The mobile carriage racks are considerably smaller than the rectangular rack rows disclosed in U.S. Pat. No. 5,140,787 and cost less to construct and to operate because entire rack rows are not moved as entire units.

Figure 16A:
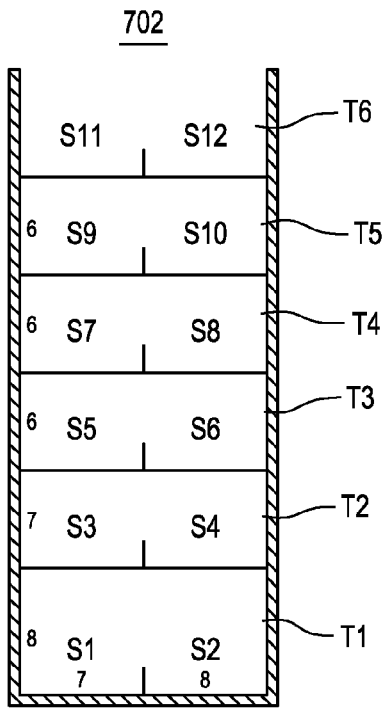
FIGS. 16A-16D are schematic side elevational views of different carriage rack storage configurations according to the present invention.
Figure 16B:
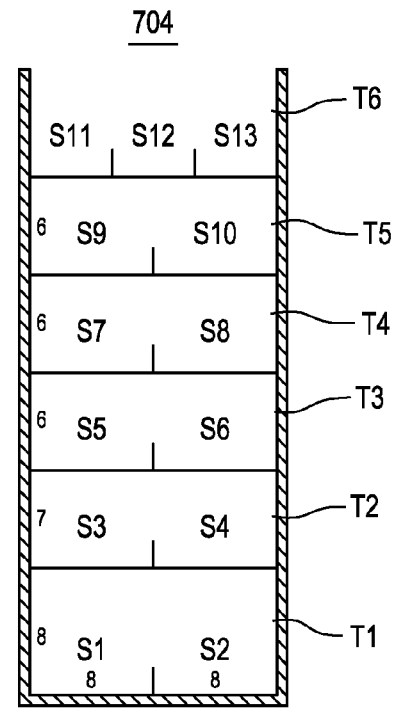
Figure 16C:
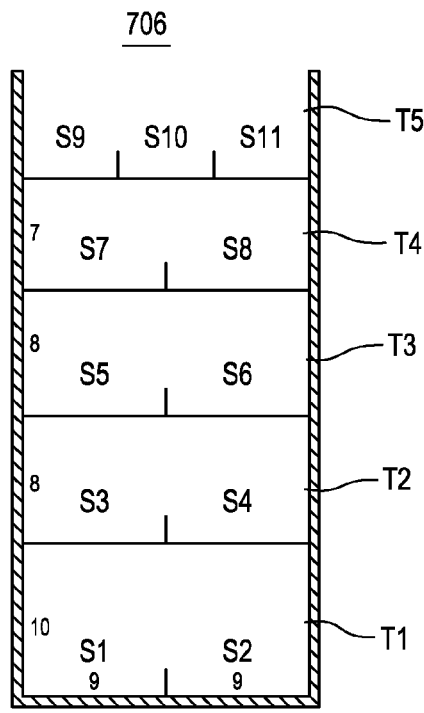
Figure 16D:
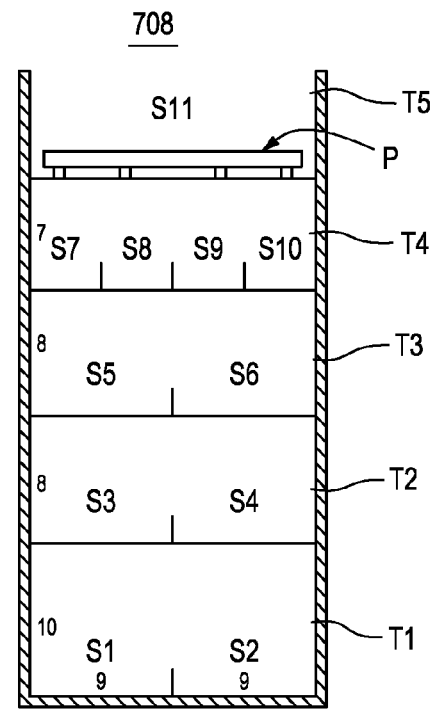

Although mobile carriage racks according to the present invention often have one or two slots per tier, that is not a limitation of the invention. Mobile carriage racks 702 and 704, FIGS. 16A and 16B, each have six tiers T1-T6, with decreasing heights of 8 feet for slots S1 and S2, 7 feet for slots S3 and S4, 6 feet for slots S5-S10, and open tops for slots S11 onward. Carriage rack 702 has an overall width of fifteen feet, with odd-numbered slots having a width of 7 feet and even-numbered slots having a width of 8 feet for asymmetric storage. Slots S1-S10 of carriage rack 704 each have symmetric widths of 8 feet, while slots S11-S13 have widths of approximately 5 feet or so to handle personal water craft, kayaks, or other more narrow craft.

Mobile carriage racks 706 and 708, FIGS. 16 C and 16D, have five tiers T1-T5 with total widths of 18 feet each. Slots S1-S8 of rack 706 each have a width of 9 feet while slots S9-S11 each have widths of 6 feet. The height for slots S1-S2 for both racks 706 and 708 is 10 feet, and the height for slots S3-S6 is 8 feet. Tier T4 of rack 708 has a height of 7 feet and four slots S7-S10 with widths of approximately 4.5 feet each. Open-topped tier T5 of rack 706 has three slots S9-S11 while tier T5 of rack 708 carries one or more pallets P to which a number of smaller items such as personal water craft are secured.

Figure 1:
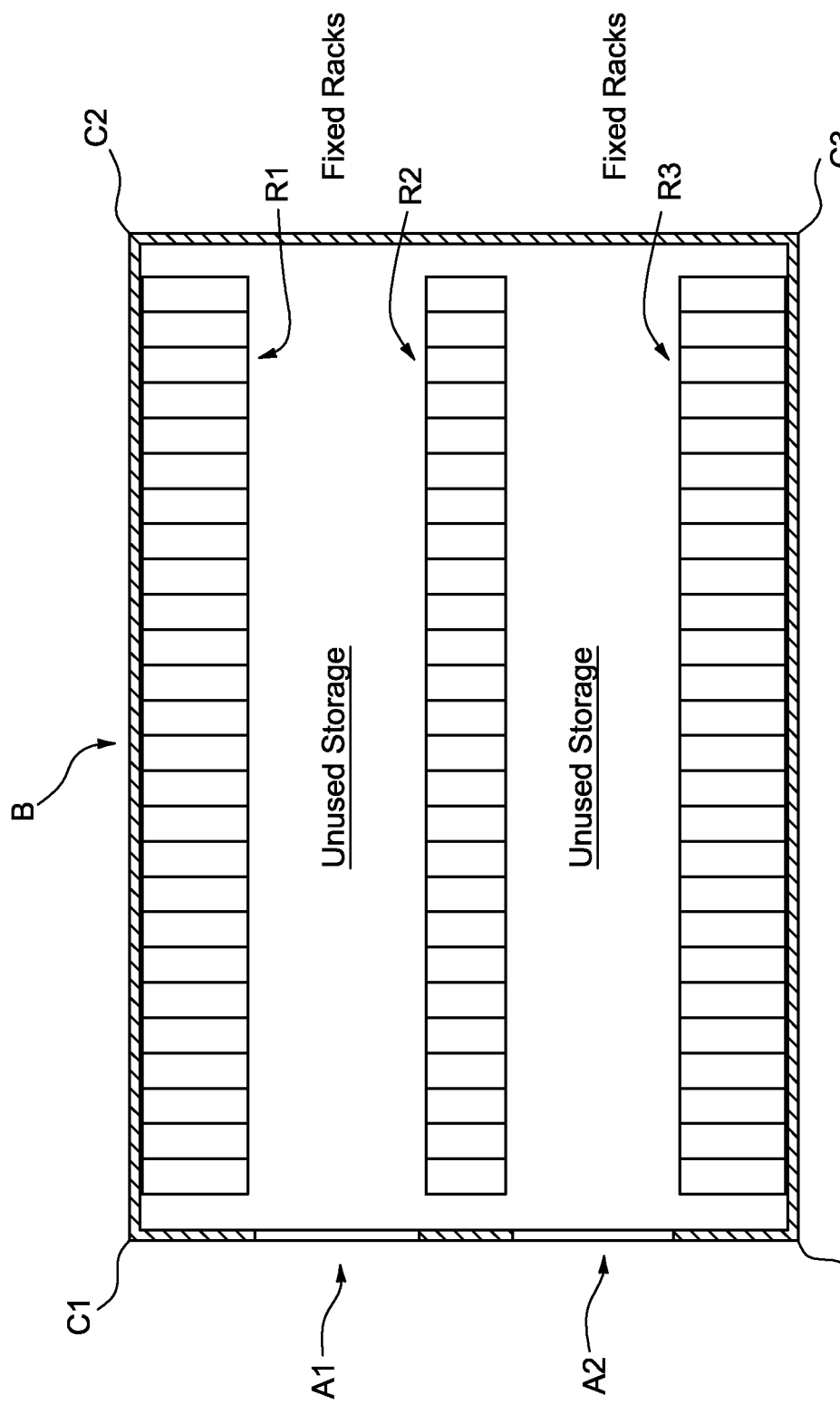
FIG. 1 depicts a conventional boat or other large object storage facility.
Figures 1, 17A:
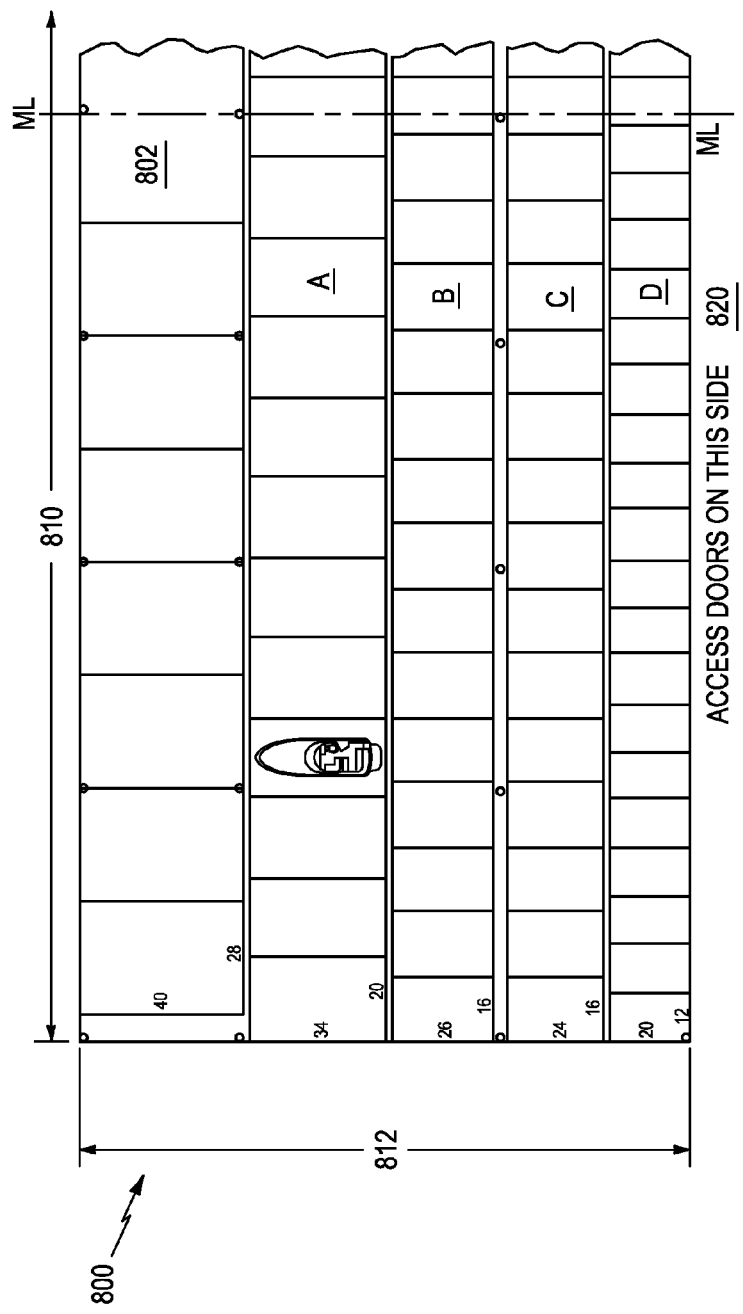
Figures 1, 18A:
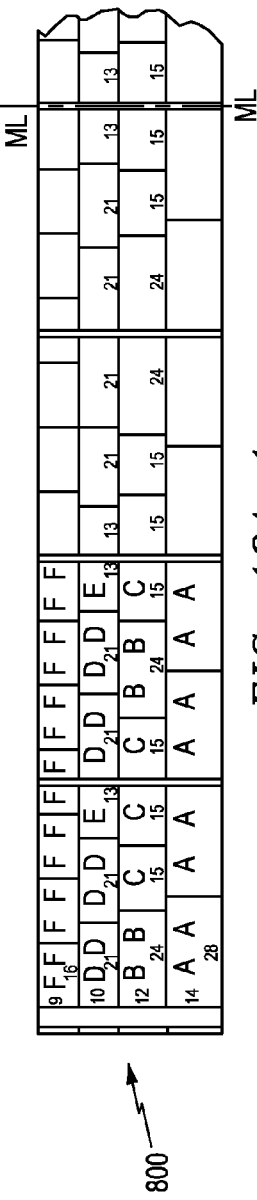
Figures 2, 17A:
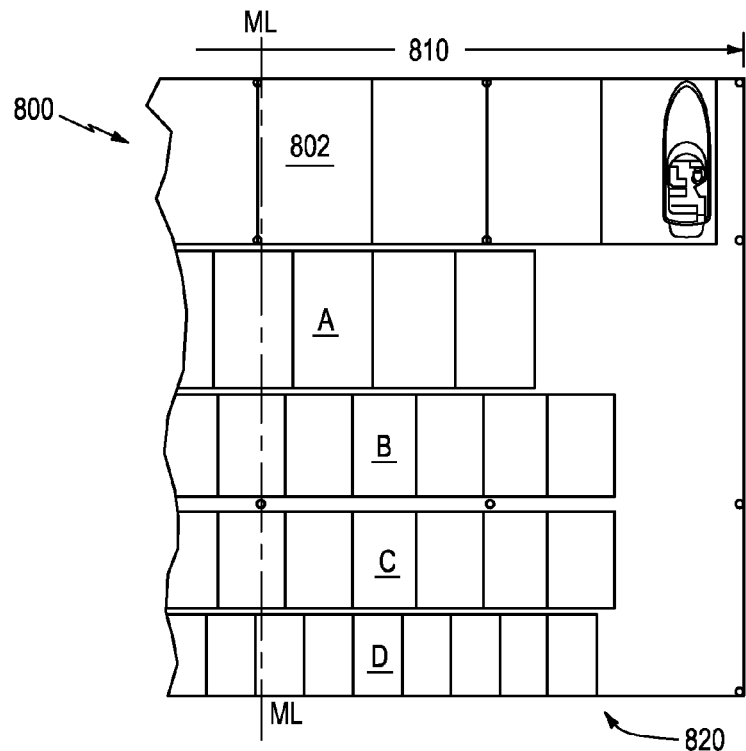
Figures 2, 18A:
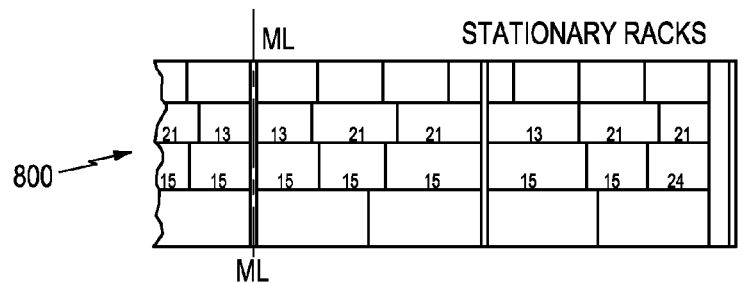
Figure 19:
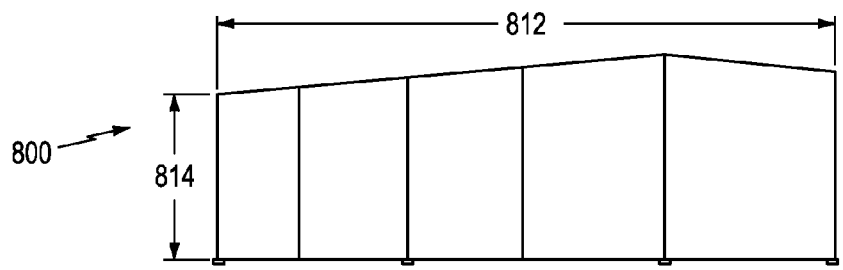
FIG. 19 is an end elevational view of the width and height of the storage facility of FIGS. 17A-1 and 17A-2.

High density storage facility 800 according to the present invention is shown in top plan view in FIGS. 17A-1 and 17A-2 and in end elevational view in FIG. 19. Storage slots are shown in side elevational view in FIGS. 18A-1 and 18A-2 for stationary rack row 802 along the back length of facility 800. Match lines ML-ML show the relationship of the A-1 to A-2 drawings. Facility 800 has an overall length of 350 feet, arrow 810, and an overall width of 150 feet, arrow 812. The roof peak has a height of 50 feet, FIG. 19, with a front height of 41 feet, arrow 814, and a rear height of 46 feet. Access doors are spaced along length 820 for the front of facility 800. Stationary storage slot configurations, all with lengths or depths of 40 feet, are provided with letters in FIG. 18A-1 to designate the following widths and heights for a total of 120 stationary storage slots:

| Slot Letter | Width | Height | Total Number |
| --- | --- | --- | --- |
| A | 14 | 14 | 24 |
| B | 12 | 12 | 12 |
| C | 15 | 12 | 12 |
| D | 10.5 | 10 | 24 |
| E | 13 | 10 | 6 |
| F | 8 | 9 | 42 |

Figures 20A-1, 20A-2, 20B, 20C, 20D-1, 20D-2:
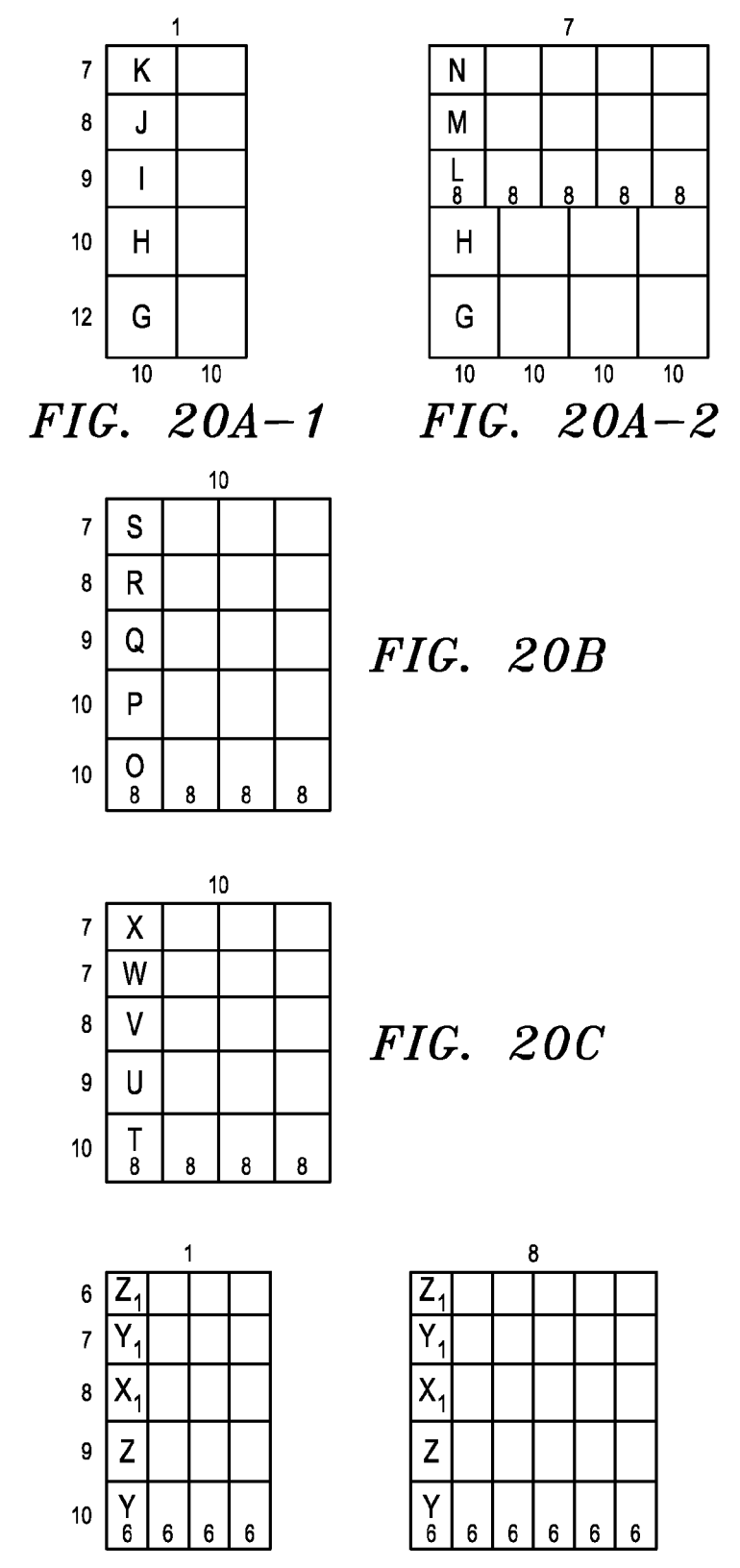

Mobile carriage racks A are shown in end view in FIGS. 20A-1 and 20A-2 with 34 foot lengths and the following widths and heights for a total of 171 mobile A slots:

| Slot Letter | Width | Height | Total Number |
| --- | --- | --- | --- |
| N | 8 | 7 | 35 |
| M | 8 | 8 | 35 |
| L | 8 | 9 | 35 |
| K | 10 | 7 | 2 |
| J | 10 | 8 | 2 |
| I | 10 | 9 | 2 |
| H | 10 | 10 | 30 |
| G | 10 | 12 | 30 |

Mobile carriage racks B are shown in end view in FIG. 20 B with 26 foot lengths and the following widths and heights for a total of 200 mobile B slots:

| Slot Letter | Width | Height | Total Number |
| --- | --- | --- | --- |
| S | 8 | 7 | 24 |
| R | 8 | 8 | 12 |
| Q | 8 | 9 | 12 |
| P | 8 | 10 | 24 |
| O | 8 | 10 | 6 |

Mobile carriage racks C are shown in end view in FIG. 20C with 24 foot lengths and the following widths and heights for a total of 200 mobile C slots:

| Slot Letter | Width | Height | Total Number |
| --- | --- | --- | --- |
| X | 8 | 7 | 40 |
| W | 8 | 7 | 40 |
| V | 8 | 8 | 40 |
| U | 8 | 9 | 40 |
| T | 8 | 10 | 40 |

Mobile carriage racks D are shown in end view in FIGS. 20 D-1 and 20D-2 with 20 foot lengths and the following widths and heights for a total of 260 mobile D slots:

| Slot Letter | Width | Height | Total Number |
| --- | --- | --- | --- |
| Z' | 6 | 6 | 52 |
| Y' | 6 | 7 | 52 |
| X' | 6 | 8 | 52 |
| Z | 6 | 9 | 52 |
| Y | 6 | 10 | 52 |

Therefore, in a footprint of 52,500 square feet, approximately 961 normal-sized boats can be stored in facility 800 and readily accessed as needed.

Figure 21:
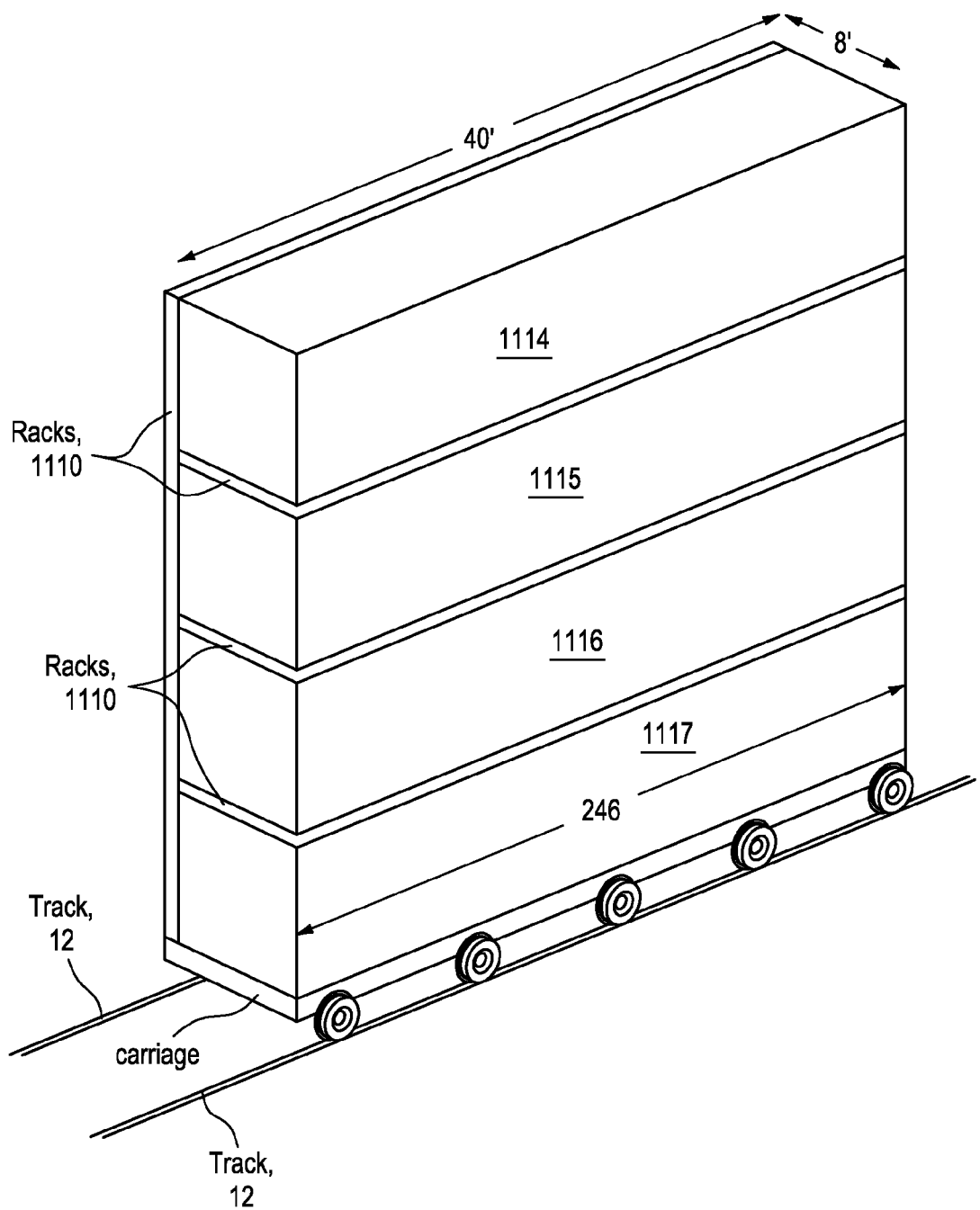
FIG. 21 depicts an exemplary carriage rack, mounted on a wheeled carriage suitable for use with an intermodal container according to exemplary embodiments.

FIG. 21 depicts exemplary carriage rack 1100, mounted on a wheeled carriage 1110 suitable for use with an intermodal container 1112 according to exemplary embodiments. The carriage rack 1100 includes four slots 1114-1118. Each slot is accessible from the length wise opening 246. In this embodiment the carriage racks 1100-1104 move in a length wise direction with respect to the length "L" of floor area 110. In this embodiment, the tracks 12 extend in a length wise direction parallel to the length "L" of floor area 110. Placement of an intermodal container into one of the slots of the carriage rack 1100 occurs from the length wise opening 246. Likewise, removal of an intermodal container into one of the slots of the carriage rack 1100 occurs from the length wise opening 246.

Figure 22:
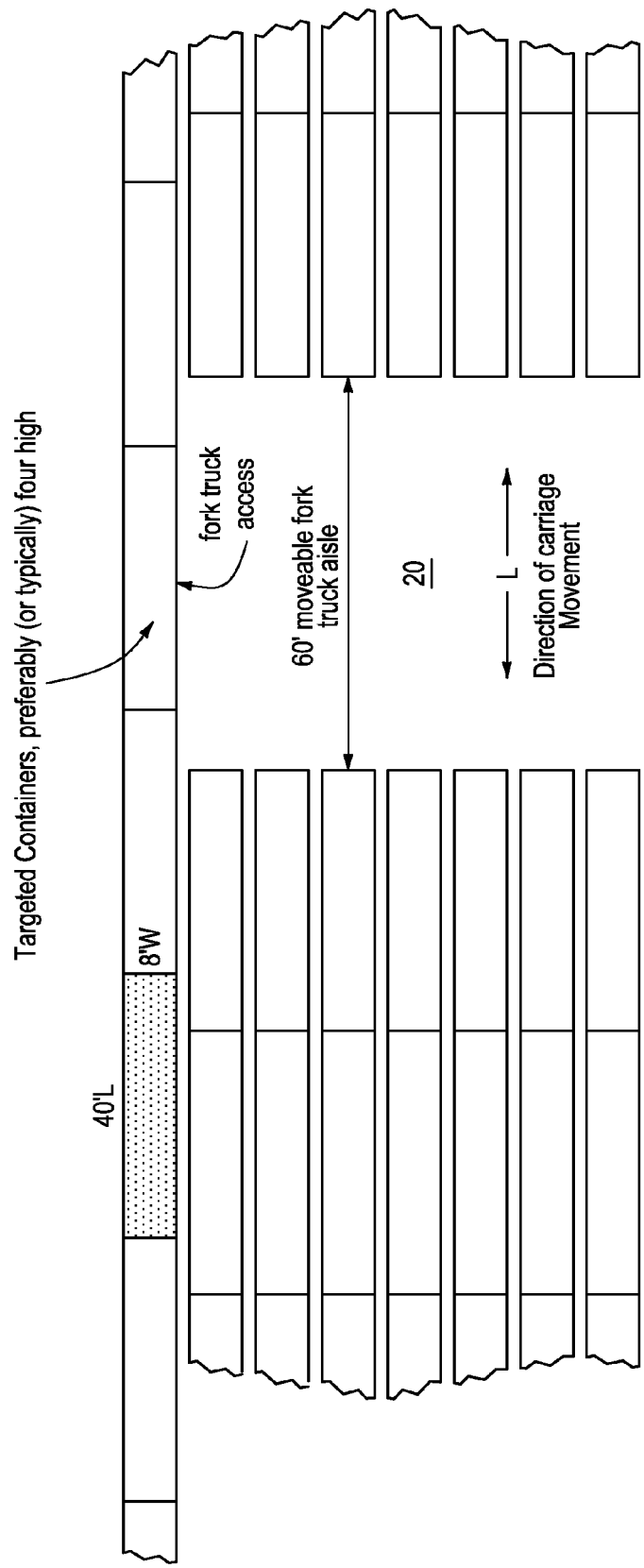
FIG. 22 depicts an exemplary overhead view of fixed racks and carriage racks configured for use with an intermodal container according to exemplary embodiments.

FIG. 22 depicts exemplary overhead view of a plurality of carriage racks 1100, mounted on a wheeled carriages 1110 suitable for use with an intermodal container 1112 according to exemplary embodiments. As exemplary depicted the carriage racks 1100 move in a length wise direction "L" to define area 20, which, in turn provides access and egress to a selected one of the carriage racks 1100. The carriage racks 1100 may move individually. In some embodiments, two or more of the carriage racks 1100 are coupled to move in unison, but can be decoupled to move an individual one of the carriage racks 1100.

As discussed above in relation to other embodiments, the carriage racks depicted in FIGS. 21 and 22, may be electromagnetically coupled and decoupled along a width wise dimension 245, FIG. 10B, or mechanically coupled and decoupled along a width wise dimension 245.

The individual carriage racks in a row of carriage racks may be separately drivable, and the remote motor control may be provided with means for separately driving carriage racks in each row independent of carriage racks in another row. When the user wants to gain access to any particular movable row or stationary rack, the user can separately drive individual carriage racks and rows to move them to appropriate positions within area 110, whereby access to desired racks can be obtained. In one embodiment, the user can gain such access by remote control.

In embodiments where a facility according to the invention is to be used for boat storage, area 20 may serve multiple purposes, such as loading/unloading, servicing a boat or other object, cleaning, and repair. In some embodiments, the storage facility may be fully or partially enclosed. The facility may or may not include a roof.

Although specific features of the present invention are shown in some drawings and not in others, this is for convenience only as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It will be apparent to those skilled in the art that other embodiments, improvements details and uses can be made consistent with the letter and spirit of the foregoing disclosure and within the scope of this patent.

What is claimed is:

1. A high density boat storage facility comprising:
   an enclosed floor area having a floor length and a floor width which is less than the floor length;
   a plurality of movable carriage racks, each carriage rack having a length, a width and a height divided from top to bottom into storage slots, the slots extending the length of the racks and being open and accessible for inserting and removing boats into and from the width ends of the carriage racks, the carriage racks being disposed in rows within the enclosed floor area and including means for rolling the carriage racks along the widthwise direction of the floor area; and
   a wall disposed substantially parallel to a widthwise side of the floor area and the widths of the carriage racks, the wall including at least one door selectively disposed along a widthwise wall for providing access to the width ends of the carriage racks, the carriage racks being rollably moveable along the width of the enclosed floor area for providing access to the width ends of chosen carriage racks from the door;
   wherein at least two rows of carriage racks are disposed within the floor area, each row capable, by independent movement of carriage racks in that row, of leaving a portion of the floor area unoccupied to provide an open access aisle which is of a size at least sufficient to provide access through the at least one door and through any successive rows of carriage racks to the width end of each chosen carriage rack upon selective movement along the width of the floor of any carriage rack otherwise occupying floor space between that chosen carriage rack and the at least one door; and
   wherein the open access aisle is further selected to be of such a size as to accommodate manipulation of the boats within the open access aisle for at least one of insertion of boats into and removal of boats from the storage slots of each chosen carriage rack.

2. A high density storage facility comprising:
   a floor area within the facility, the facility having an access side with at least one access door to which successive open access aisles can be provided across the floor area;
   a plurality of rows of movable carriage racks, each row having a plurality of the carriage racks, each carriage rack having a height, a length and a width, and each carriage rack defining a plurality of tiers having an opening side substantially parallel to the access side, each tier defining at least one storage slot, each slot having an opening on the opening side for inserting and removing an object into and from that slot when chosen;
   the carriage racks being disposed in a plurality of rows within the floor area to be (1) independently movable along the floor area in a direction substantially parallel with the access side of the facility and (2) arranged in the rows within the floor area with the opening sides of the carriage racks facing the access side of the facility, each row being able to provide sufficient unoccupied floor space, relative to the floor area, to provide access from the access side of the facility to at least one chosen storage slot behind that row;
   wherein an open access aisle of unoccupied floor space is capable of being configured from the access side of the facility to allow access to the openings of a chosen carriage rack by shifting a plurality of other racks within successive rows, at least some of the other racks initially occupying floor space of the open access aisle and capable of being shifted in the direction substantially parallel with the access side of the facility; and
   wherein the open access aisle is further selected to be of such a size as to accommodate manipulation of the objects within the open access aisle for at least one of insertion of objects into and removal of objects from the storage slots of that chosen carriage rack.

3. The facility of claim 2 further comprising at least one independently controllable motor to drivably move each carriage rack in either direction across at least a portion of the width of the floor area.

4. The facility of claim 2 wherein as many rows of carriage racks are disposed within the floor area as will fit along the length of the floor area and leave a portion of the floor area unoccupied as the open access aisle, the open access aisle being of a size at least sufficient to provide access to the opening sides of the carriage racks upon selective movement of the carriage racks in the rows of carriage racks in the direction substantially parallel with the access side of the facility.

5. The facility of claim 4 wherein when an open access aisle is provided, access is allowed to a width side of the chosen carriage rack.

6. A high density storage facility, comprising:
a plurality of walls defining an enclosed area, wherein a first wall and a second wall in the plurality of walls defines a first distance from the first wall to the second wall along a first axis, a third wall in the plurality of walls comprises an access wall, and the access wall has one or more openings defining an entry axis through the one or more openings;
a plurality of rows of carriage racks, each carriage rack having a first dimension along the first axis and at least one opening facing the access wall and defining an object insertion axis substantially parallel to the entry axis, wherein the carriage racks in each row are movable along the first axis, each row is substantially parallel to the first axis and positioned proximate an adjacent row along the entry axis, and the sum of the first dimensions of each carriage rack in each row is less than the first distance by an amount equal to a second distance.

7. The high density storage facility of claim 6, wherein the plurality of walls comprises four walls.

8. The high density storage facility of claim 6, wherein the first axis is a facility width axis, the plurality of walls further comprises a fourth wall, the fourth wall and the access wall define a third distance from the fourth wall to the access wall along the entry axis, and the third distance is greater than the first distance.

9. The high density storage facility of claim 6, wherein the carriage racks in the plurality of rows of carriage racks include a carriage rack having a maximum value of the first dimension, and the second distance is greater than the maximum value.

10. The high density storage facility of claim 6, wherein the plurality of carriage racks in each row which are independently movable along the first axis are independently movable to selectively define passages from the access wall to any selected one of the carriage racks.

11. The high density storage facility of claim 6, further comprising a stationary row of carriage racks located between the first and second walls and located adjacent a one of the rows of carriage racks in the plurality of carriage racks along the entry axis.

12. The high density storage facility of claim 6, wherein each carriage rack has a plurality of tiers, each tier has at least one slot, and the at least one opening corresponds to the at least one slot.

13. The high density storage facility of claim 6, wherein each carriage rack in each row in the plurality of rows of carriage racks is movable independent of other carriage racks in the same row.

* * * * *